United States Patent [19]

Talarico

[11] Patent Number: 5,560,215
[45] Date of Patent: Oct. 1, 1996

US005560215A

[54] GAS PROCESSOR

[76] Inventor: Angelo Talarico, 69-73 Victoria St, Fitzroy, Victoria 3065, Australia

[21] Appl. No.: 430,783

[22] Filed: Apr. 28, 1995

Related U.S. Application Data

[63] Continuation of Ser. No. 134,889, Oct. 13, 1993, abandoned.
[51] Int. Cl.$^6$ ................................................. F25B 45/00
[52] U.S. Cl. ............................ 62/149; 62/292; 62/468; 62/192
[58] Field of Search ........................ 62/77, 85, 149, 62/192, 195, 292, 475, 468

[56] References Cited

U.S. PATENT DOCUMENTS 5,172,562  12/1992  Manz et al. .............................. 62/149
5,203,177  4/1993  Manz et al. .............................. 62/149

*Primary Examiner*—John M. Sollecito
*Attorney, Agent, or Firm*—Thomas R. Vigil

[57] ABSTRACT

A refrigerant processor having
  a pump for recovering refrigerant from a refrigeration system,
  a filter,
  a pump for pumping recovered refrigerant through the filter,
  a pump for evacuating said refrigeration system, means for charging said refrigeration system with refrigerant, and
  a controller.

17 Claims, 19 Drawing Sheets

GAS PROCESSOR

This is a continuation of application Ser. No. 08/134,889 filed on Oct. 13, 1993 now abandoned.

FIELD OF THE INVENTION

This invention relates to a gas processor.

BACKGROUND OF THE INVENTION

There is a need to service compressor type refrigerant units particularly those used in automotive air-conditioning units.

SUMMARY OF THE INVENTION

The present invention provides
a gas processor adapted to recover, recycle, evacuate and charge refrigerant in a refrigeration system.

PREFERRED ASPECTS OF THE INVENTION

Preferably the system is an air conditioning system and most preferably is an automotive air conditioning system. However, the invention has general application in refrigeration.

Preferably recovery will pause to allow a pause period for refrigerant to vaporise.

Preferably the processor can detect the amount of refrigerant in a storage cylinder for refrigerant and will not overfill the storage cylinder.

Preferably the processor will not charge a system if there is less than a predetermined amount of refrigerant in the storage cylinder.

Preferably the process can detect pressure in a system and will not evacuate a system if greater than a predetermined pressure is in the cylinder.

Preferably the process can recover refrigerant from within itself.

Preferably recycling will not occur unless there is more than a predetermined amount of refrigerant in the storage cylinder.

Preferably recycling involves use of a liquid pump.

Recycling preferably involves pumping liquid refrigerant through a filter.

Preferably the processor can display the amount of refrigerant in a storage cylinder.

Preferably the processor can display the number of charges of a predetermined size in a storage cylinder.

Preferably recovery ceases when system pressure falls below a predetermined value.

Preferably evacuation ceases when system pressure falls below a predetermined value.

Preferably recycling can be done for a predetermined time.

Preferably charging ceases when a predetermined amount of refrigerant has been charged to a system.

The process preferably comprises at least some of the following integers:

(a) a compressor for recovering and compressing refrigerant, (b) a liquid pump for pumping liquid refrigerant, (c) a filter for filtering liquid refrigerant, (d) a vacuum pump for evacuating, (e) a means for taking a measure of the contents of a storage cylinder, and (f) a microprocessor for controlling.

A specific construction of an exemplary gas processor in accordance with this invention will now be described with the aid of the accompanying drawings.

DESCRIPTION OF THE VIEW OF THE DRAWINGS

Figure 4A:
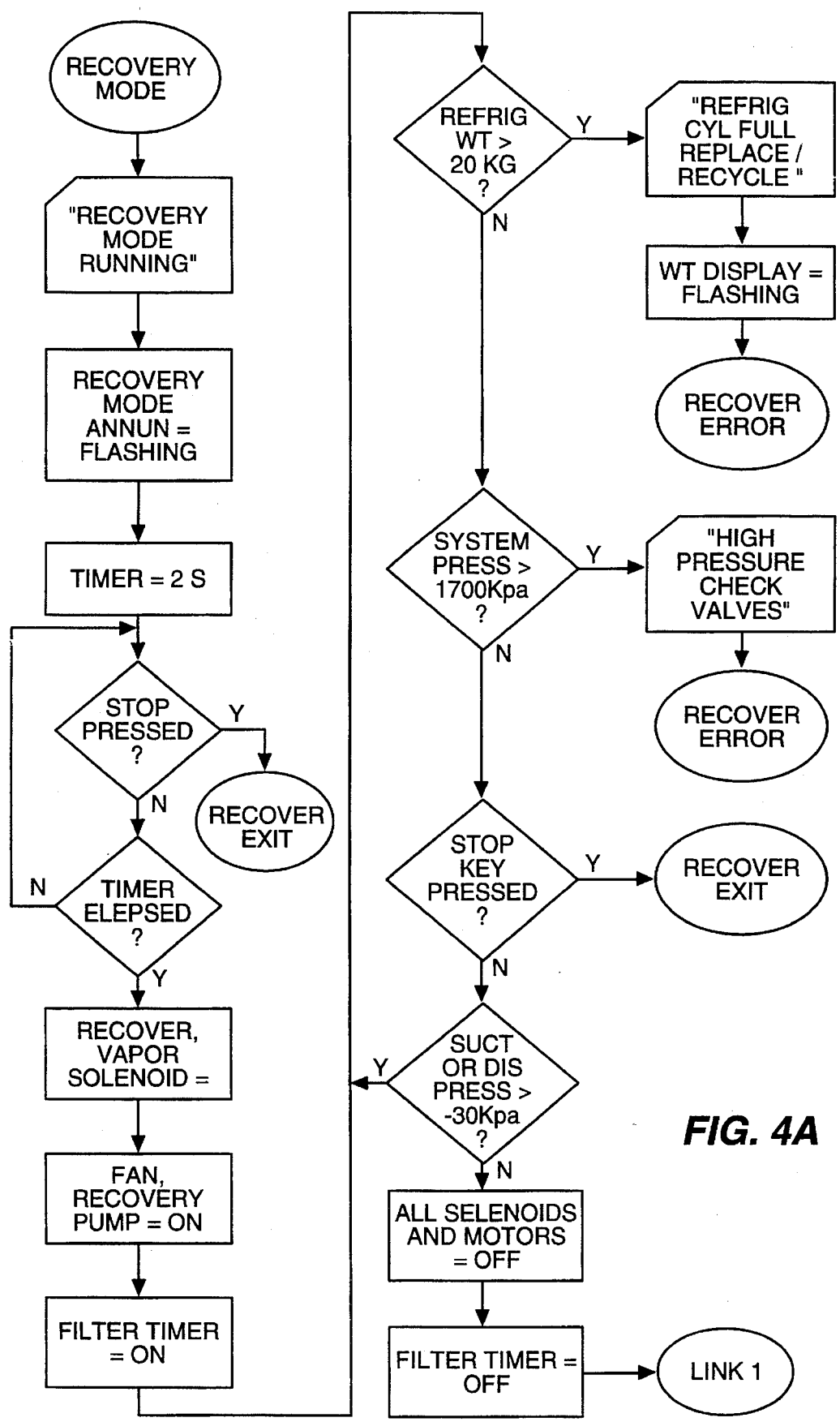
Figure 4B:
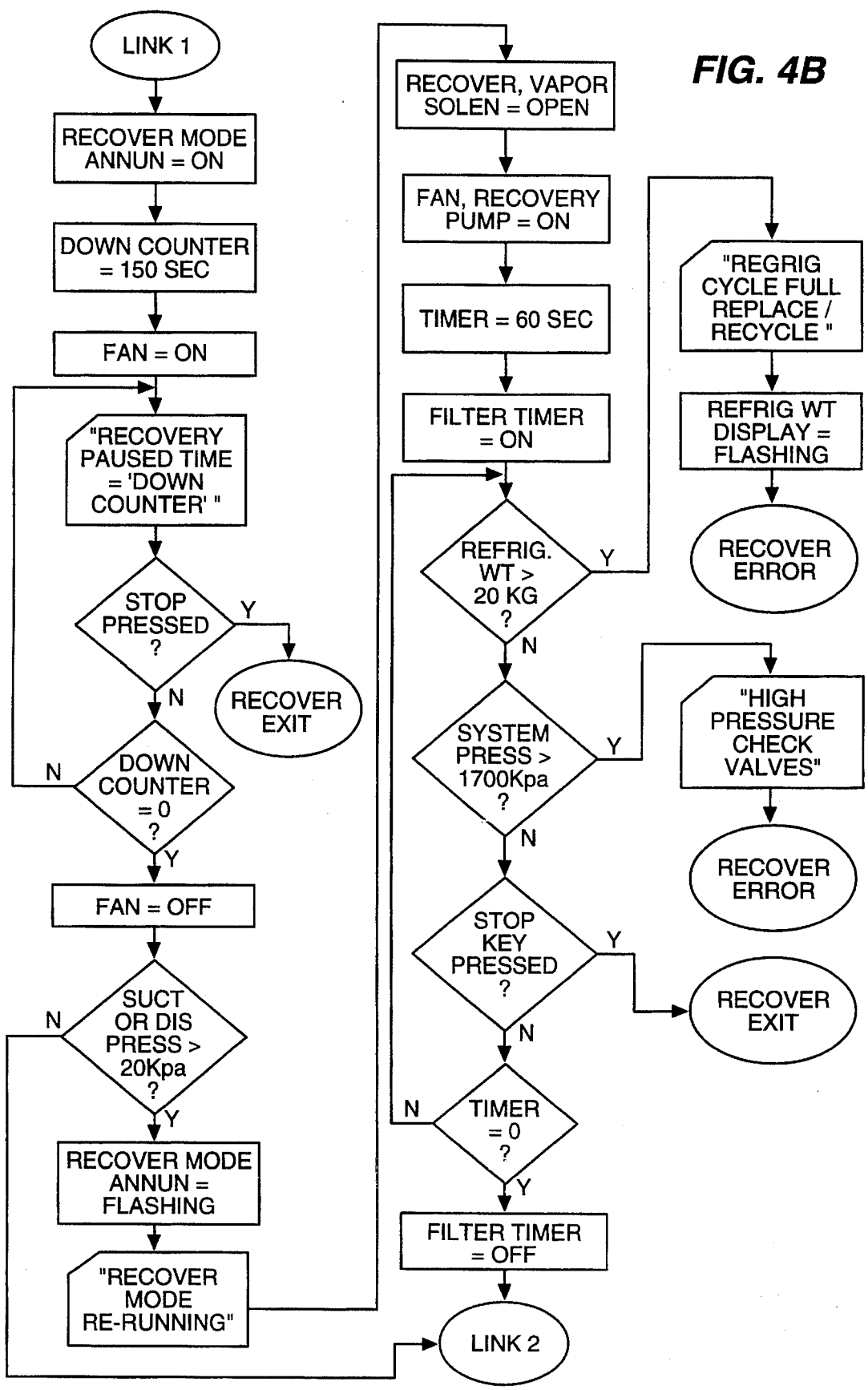
Figure 4C:
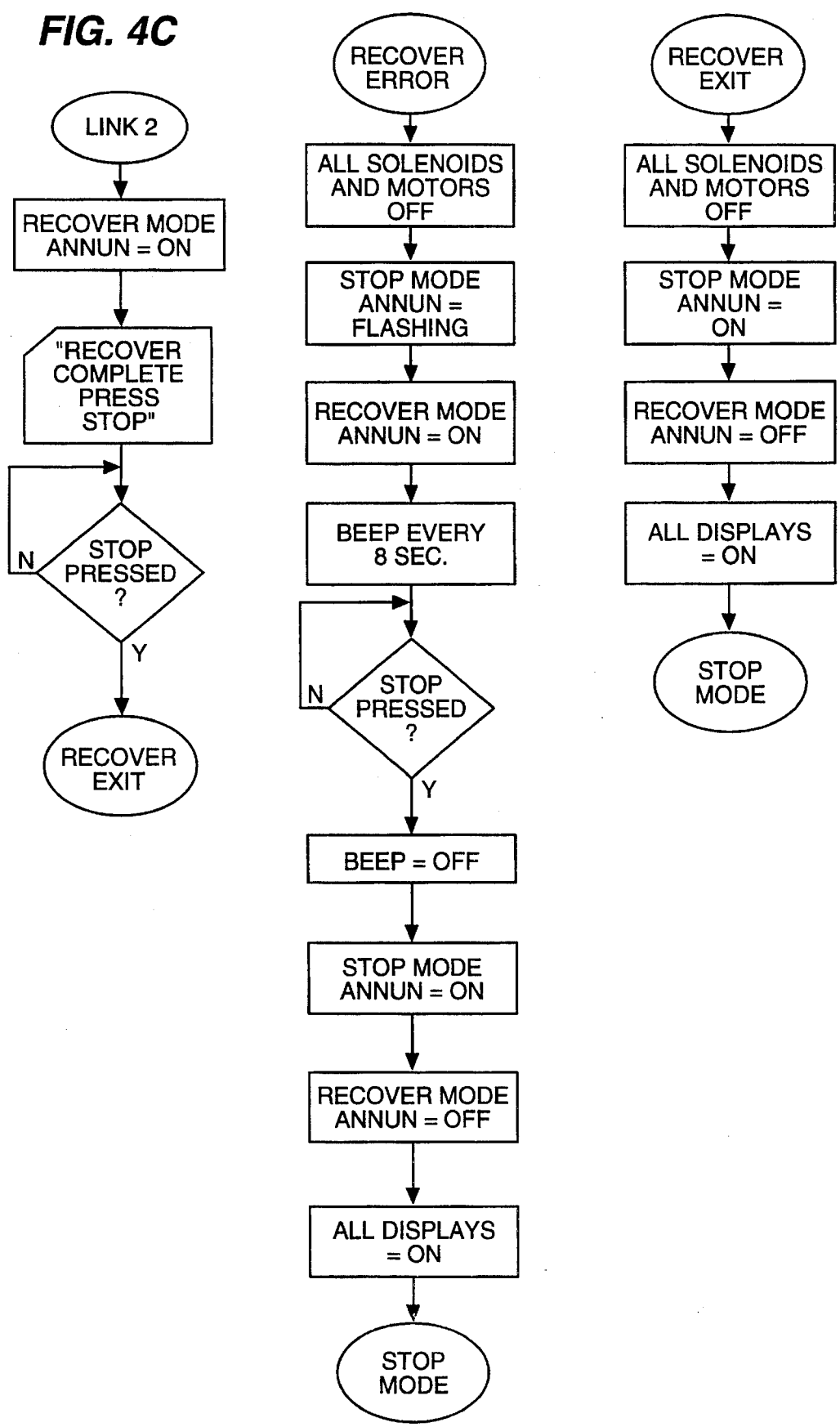
Figure 5A:
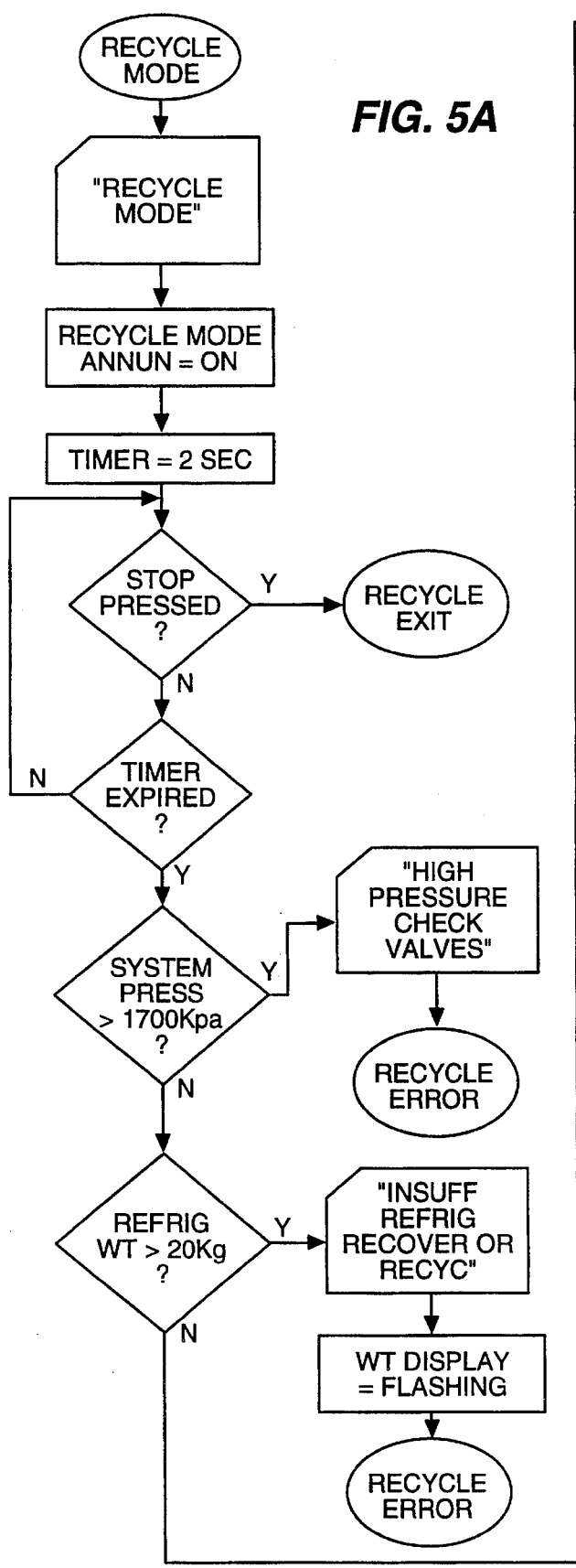
Figure 5A:
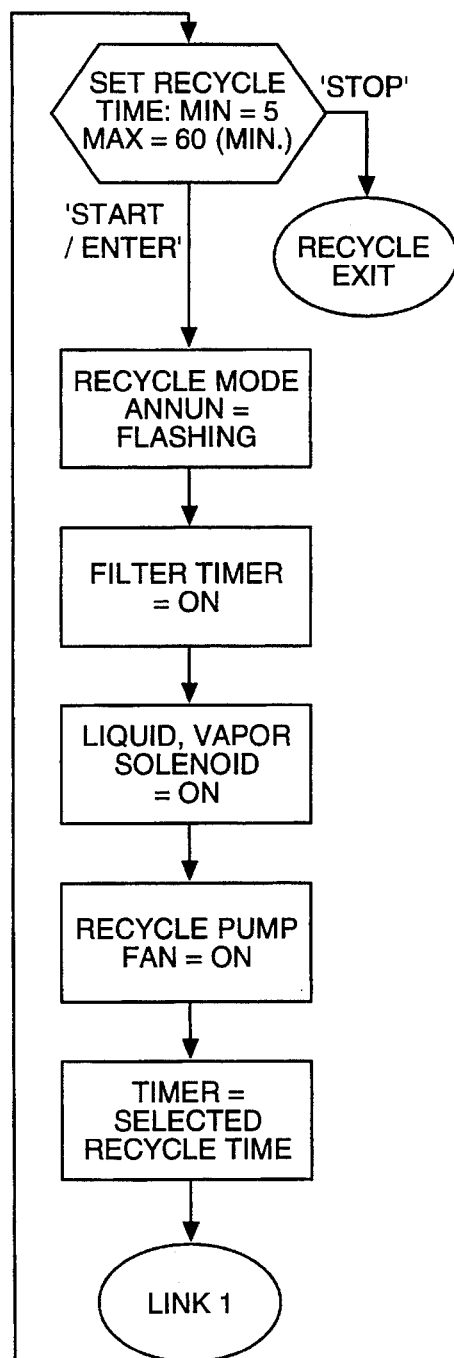
Figure 5B:
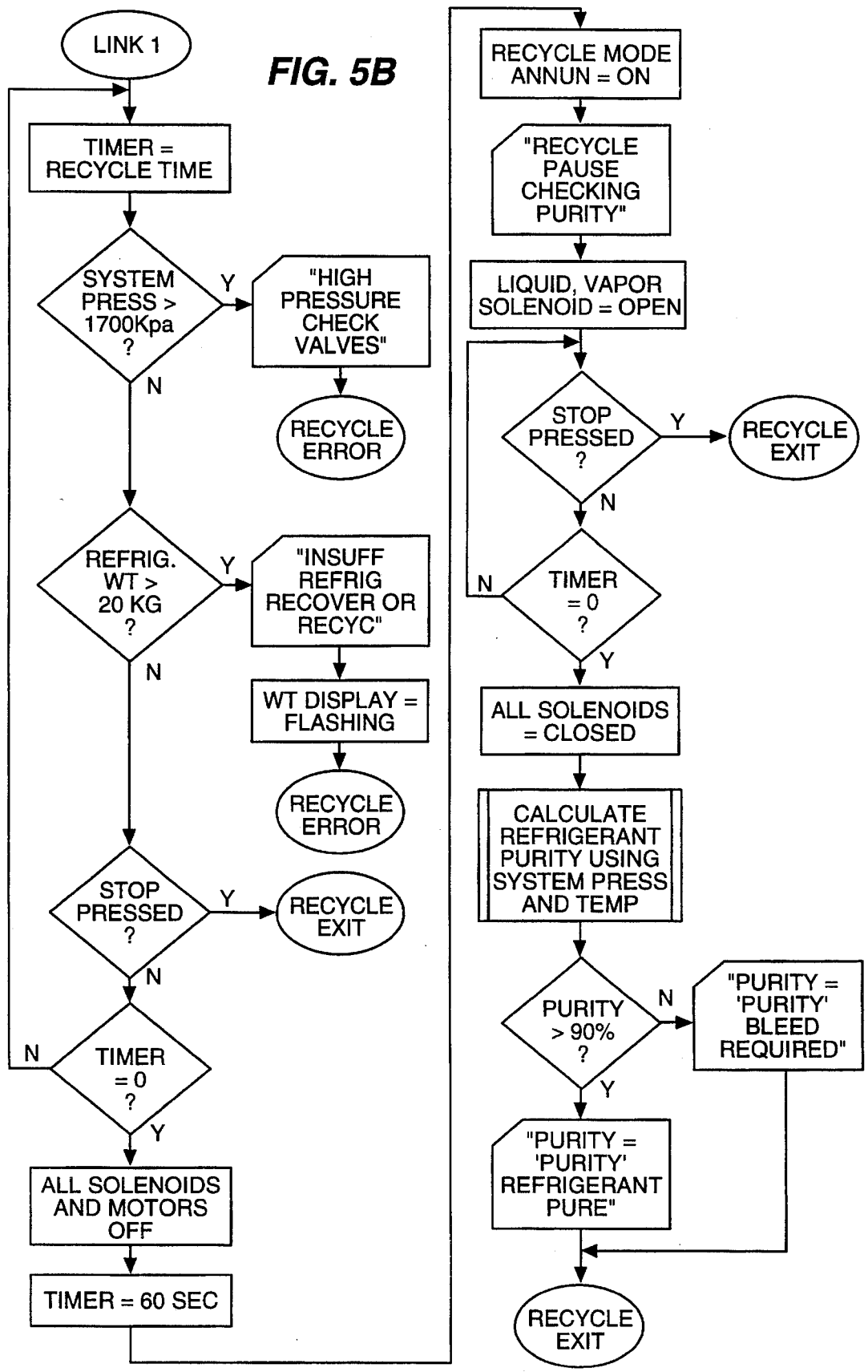
Figure 5C:
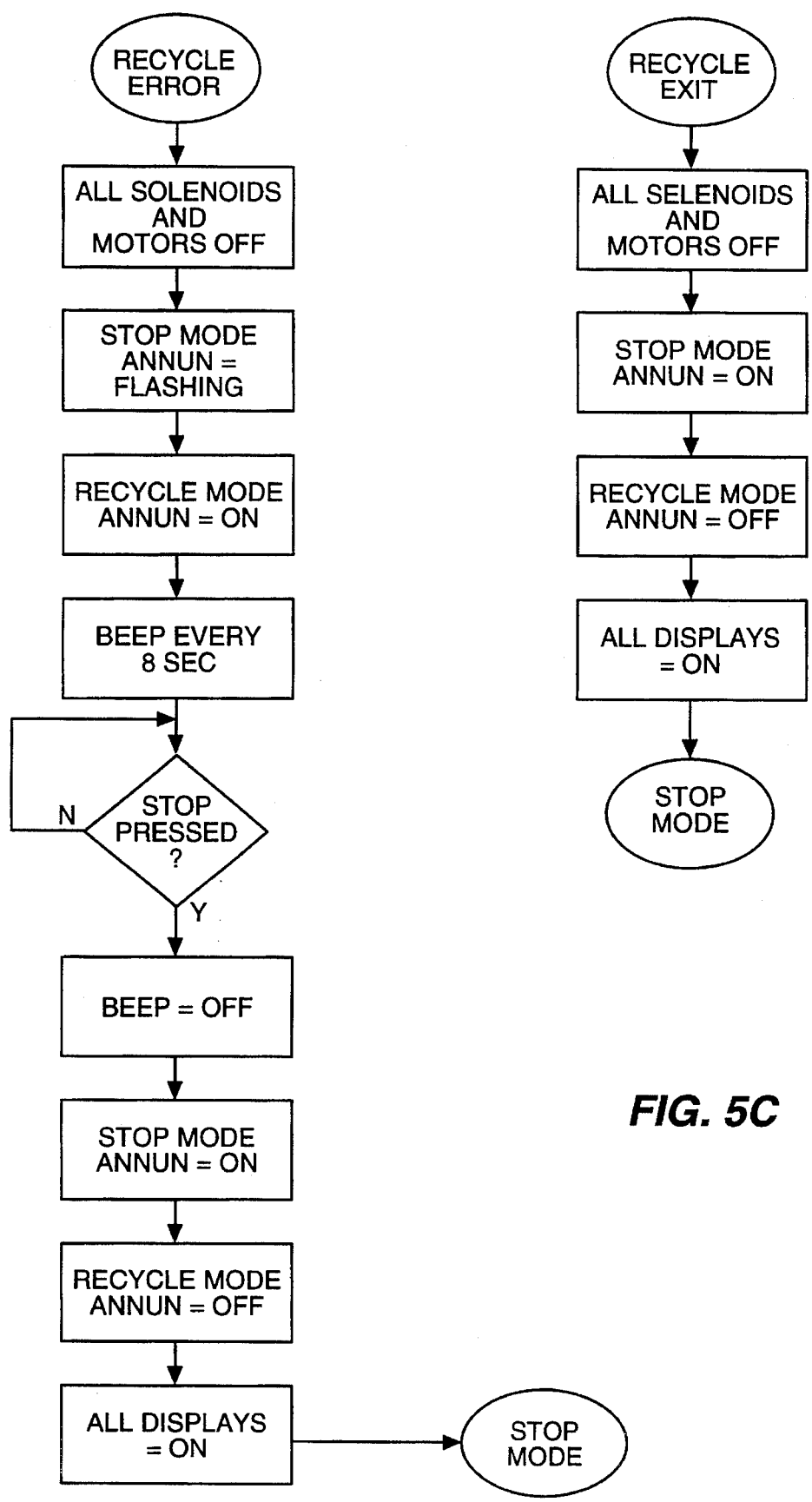
Figure 6:
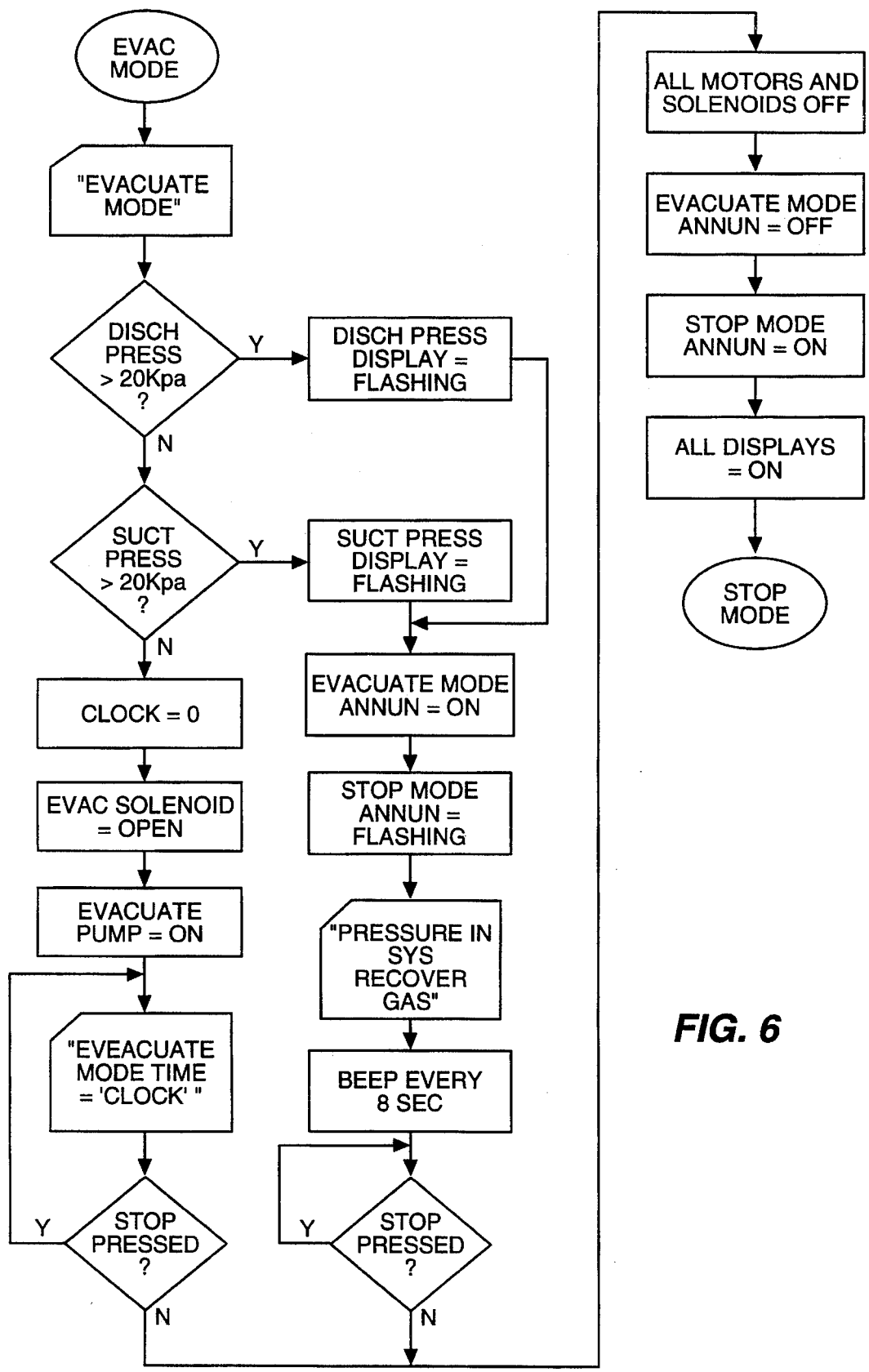
Figure 7A:
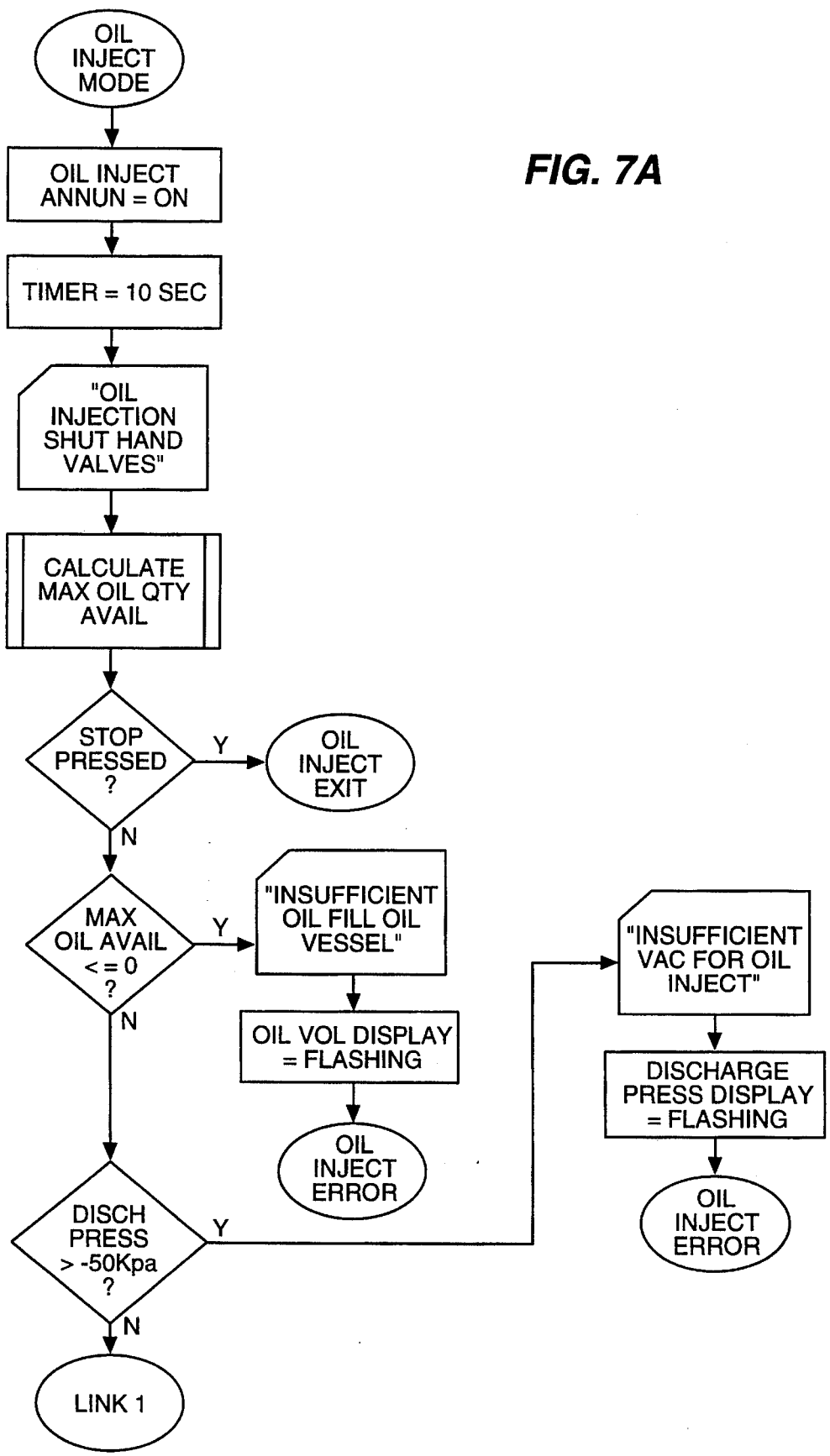
Figure 7B:
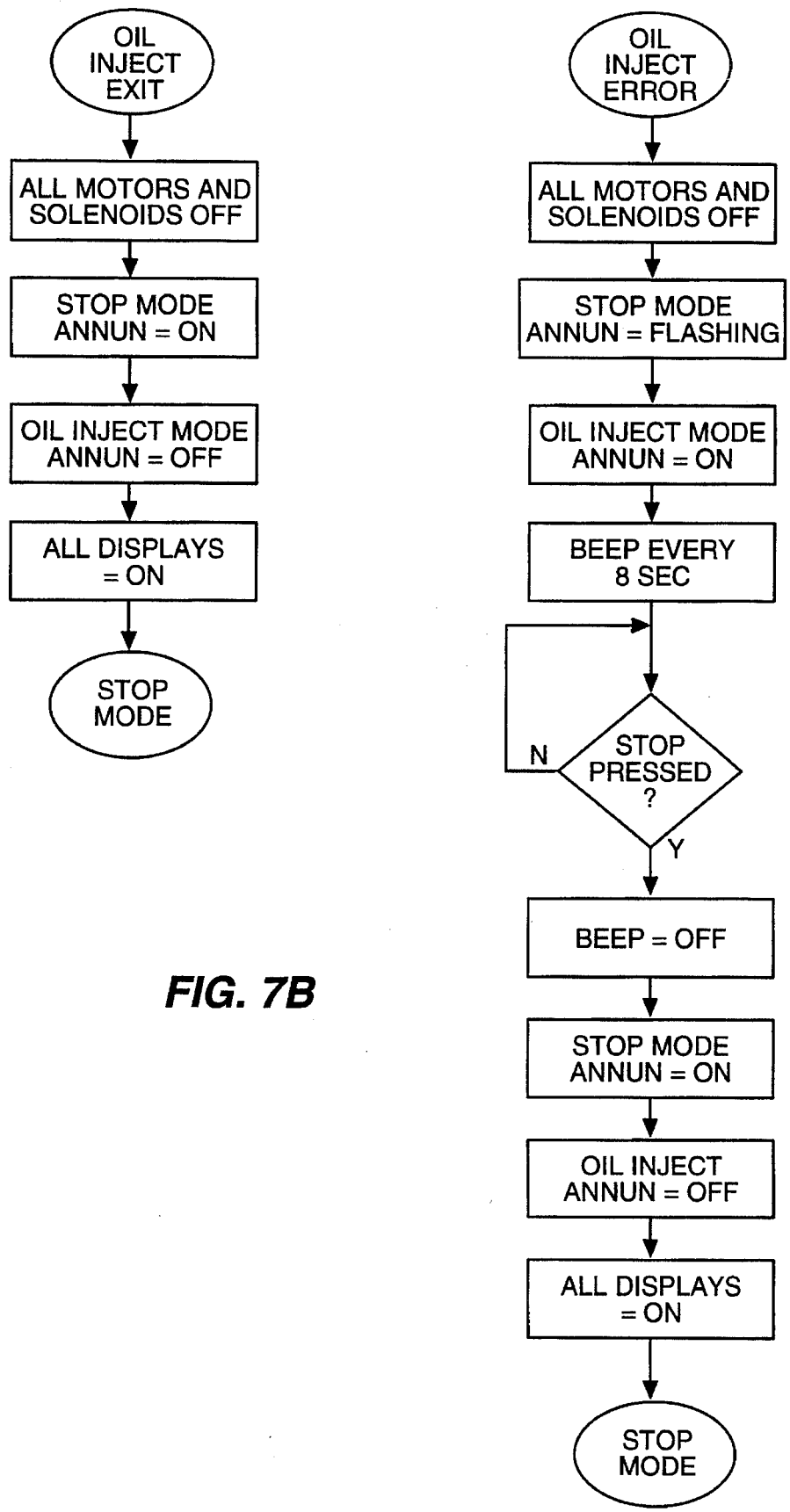
Figure 7C:
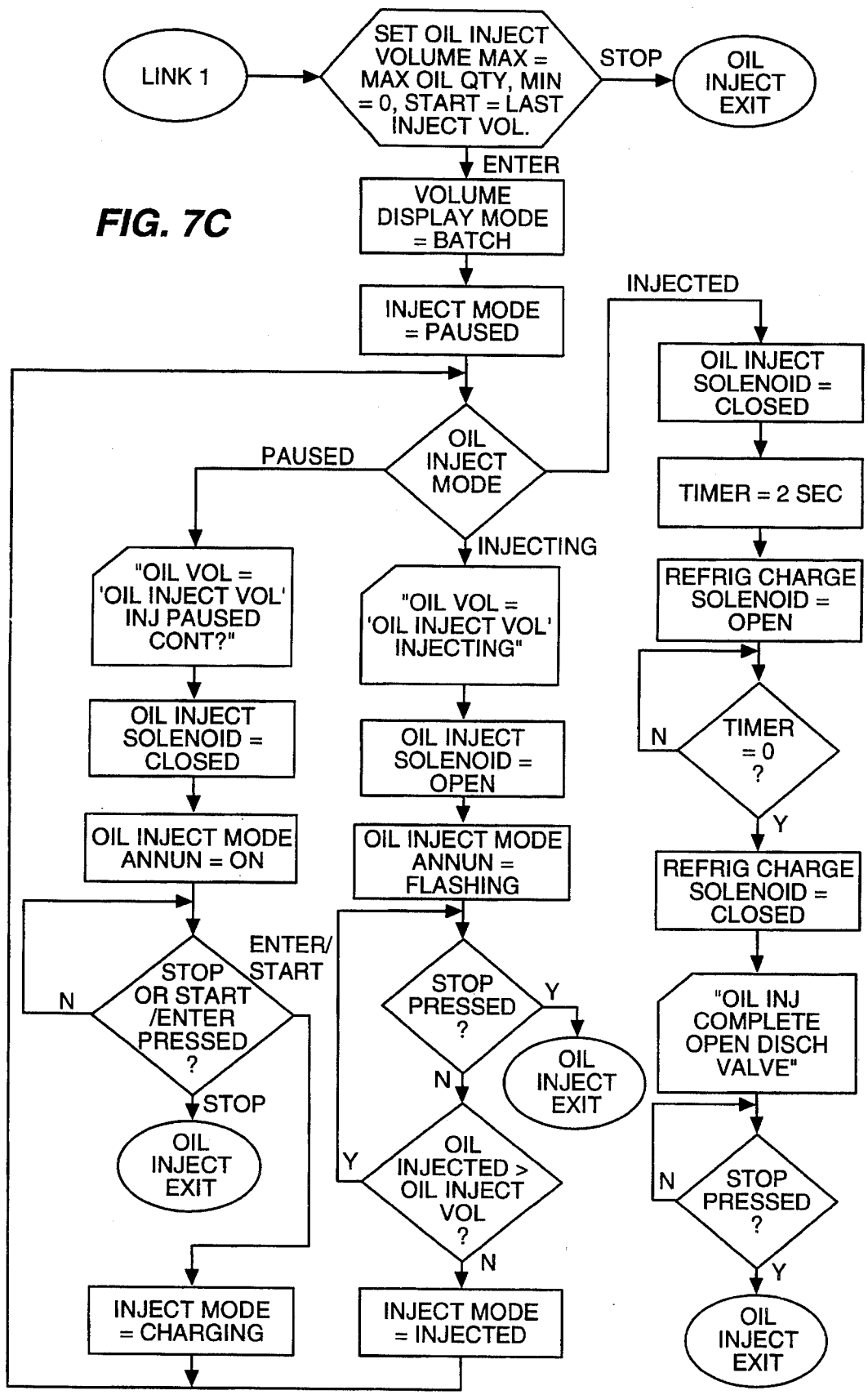
Figure 8A:
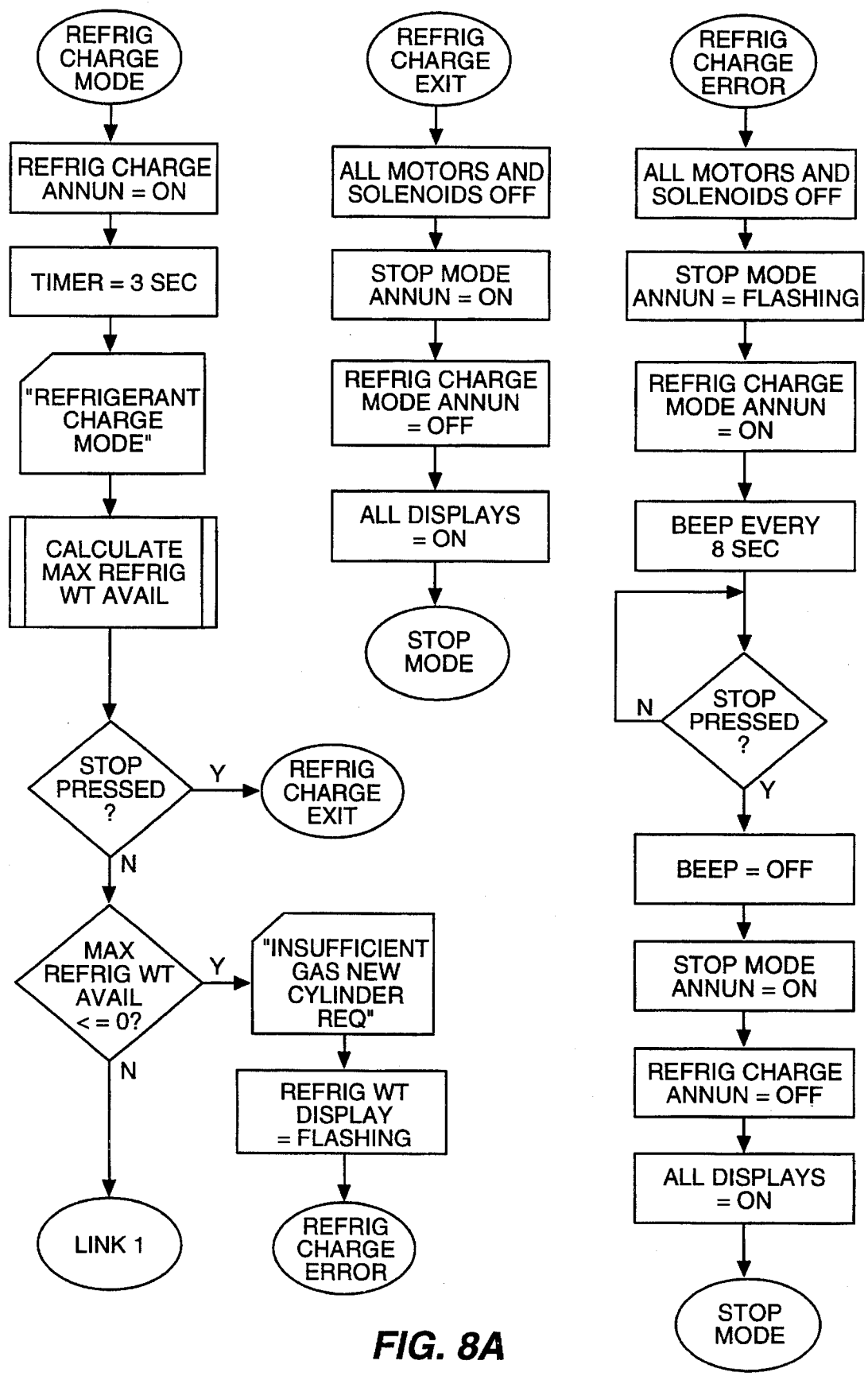
Figure 8B:
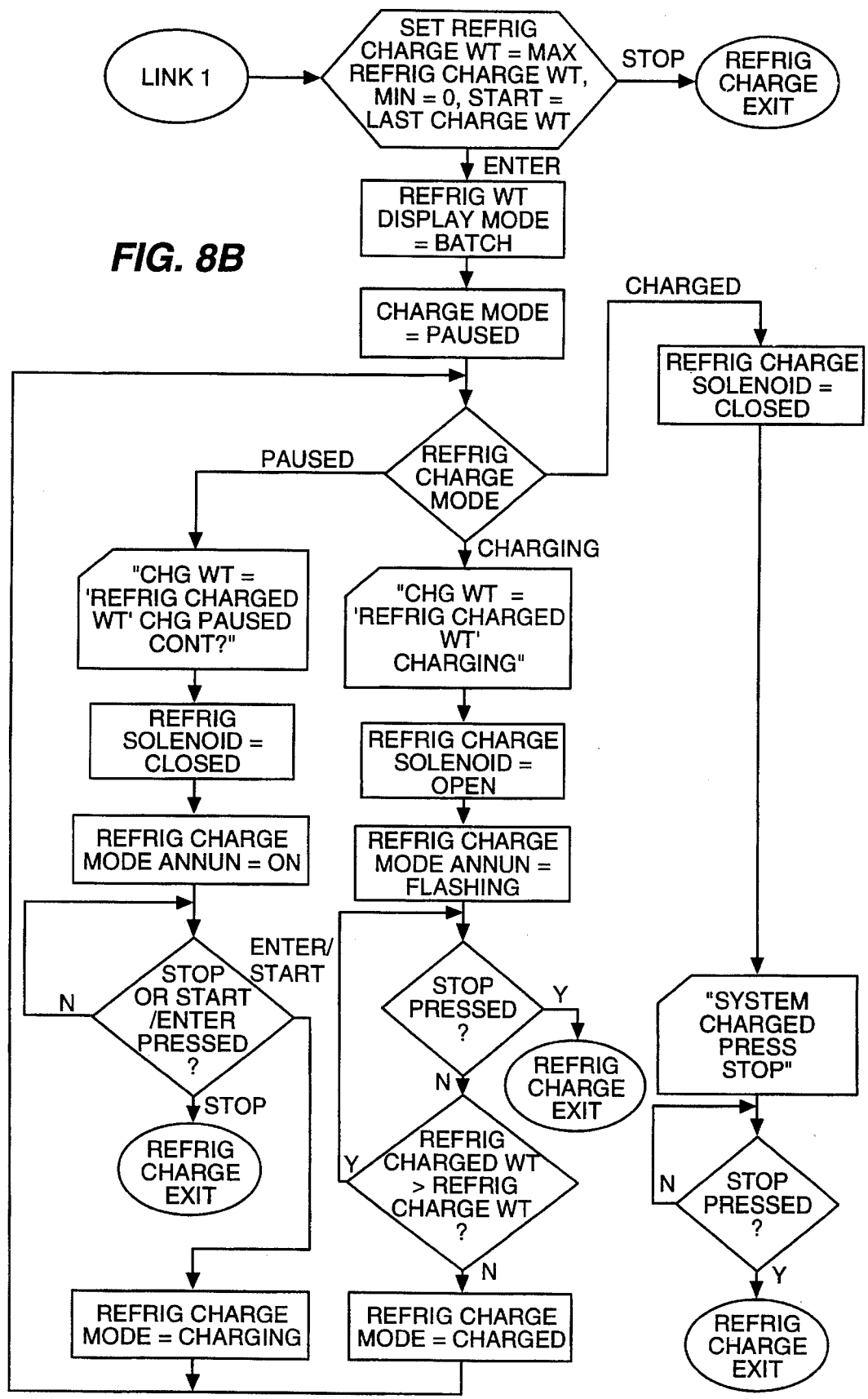
Figure 9A:
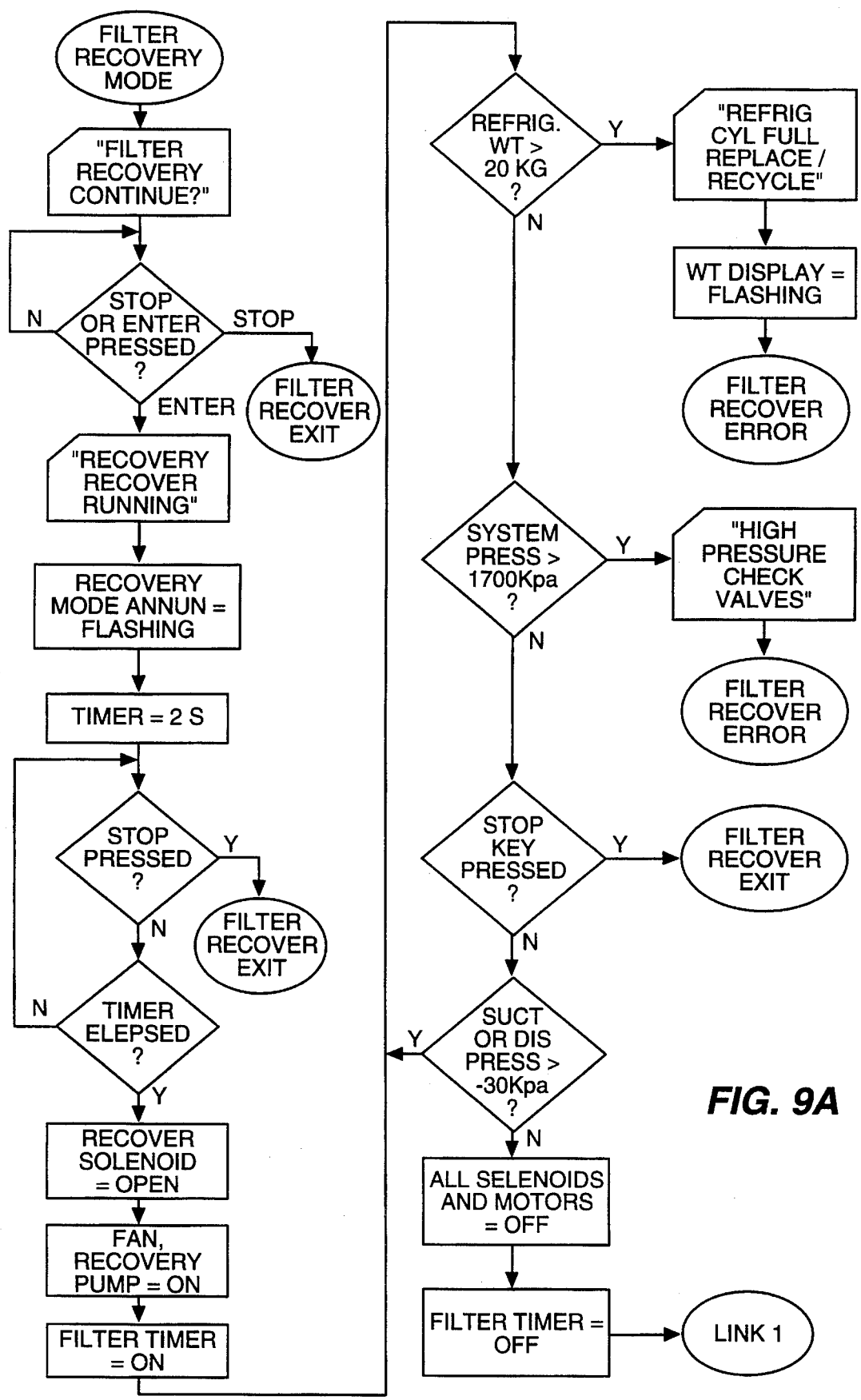
Figure 9B:
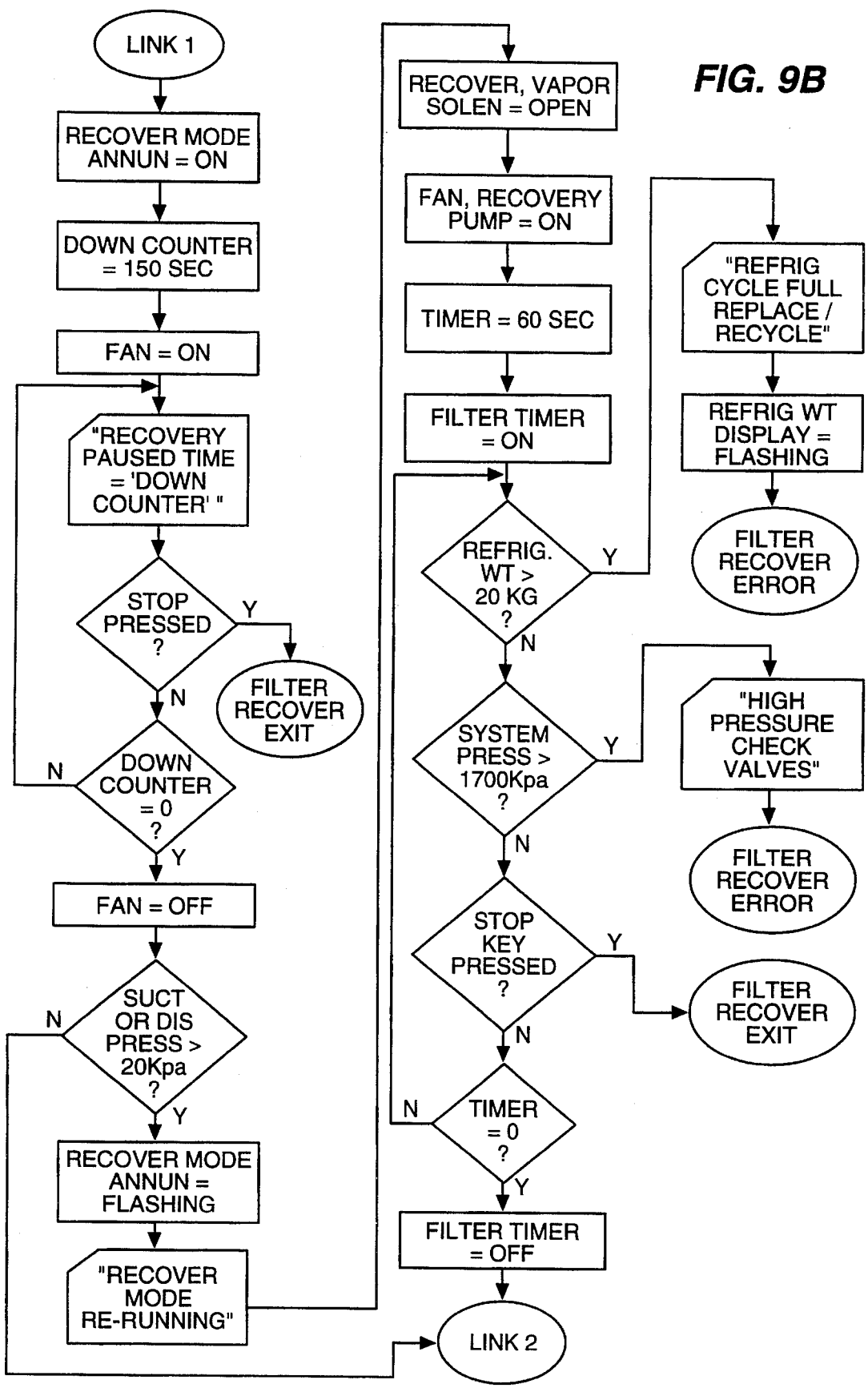
Figure 9C:
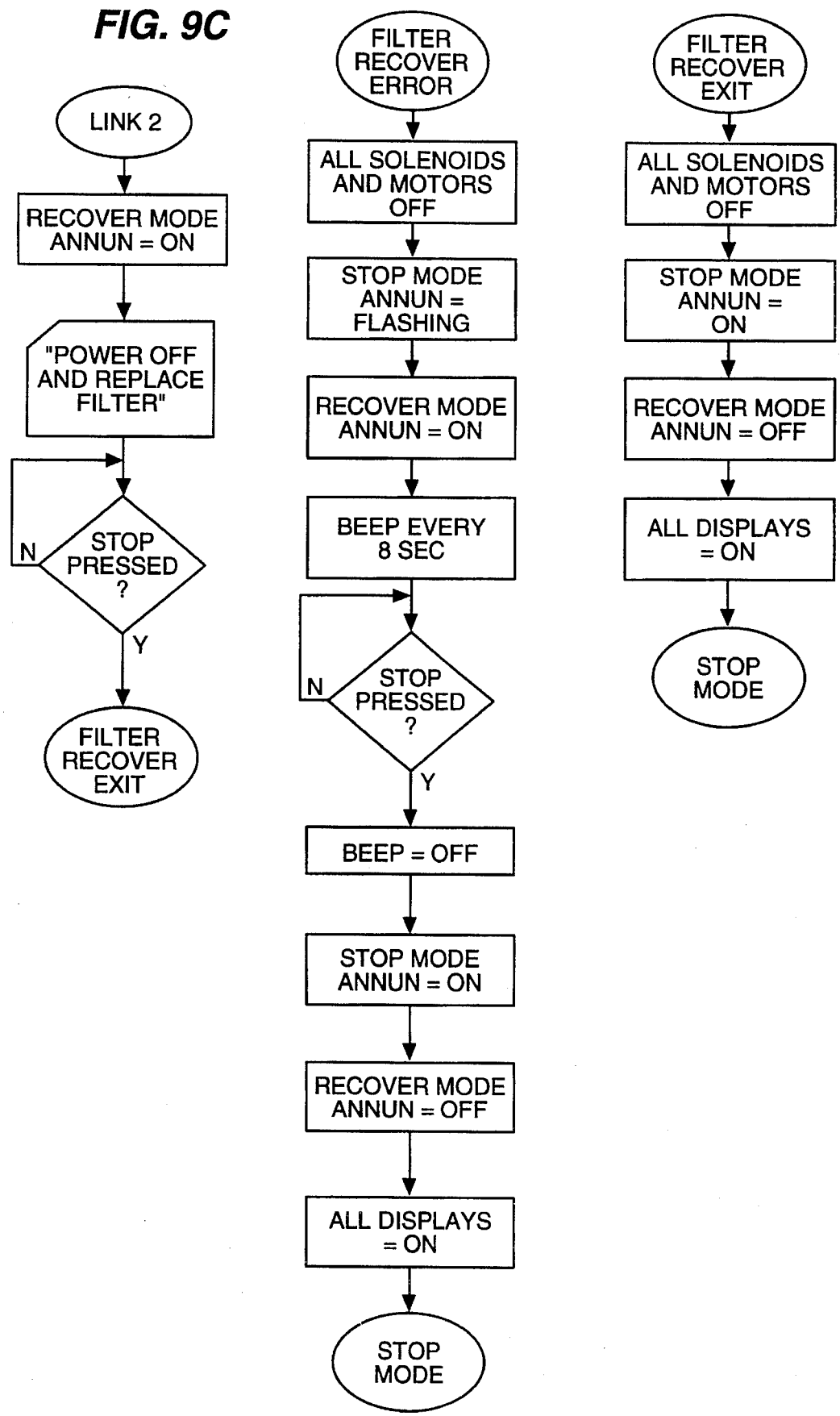

FIGS. 4A, 4B and 4C together are a flow chart of one mode of operation,

FIGS. 5A, 5B and 5C together are a flow chart of another mode of operation,

FIG. 6 is a flow chart of another mode of operation,

FIGS. 7A, 7B and 7C together are a flow chart of another mode of operation,

FIGS. 8A and 8B together are a flow chart of another mode of operation,

FIGS. 9A, 9B and 9C together are a flow chart of another mode of operation, and

Figure 10:
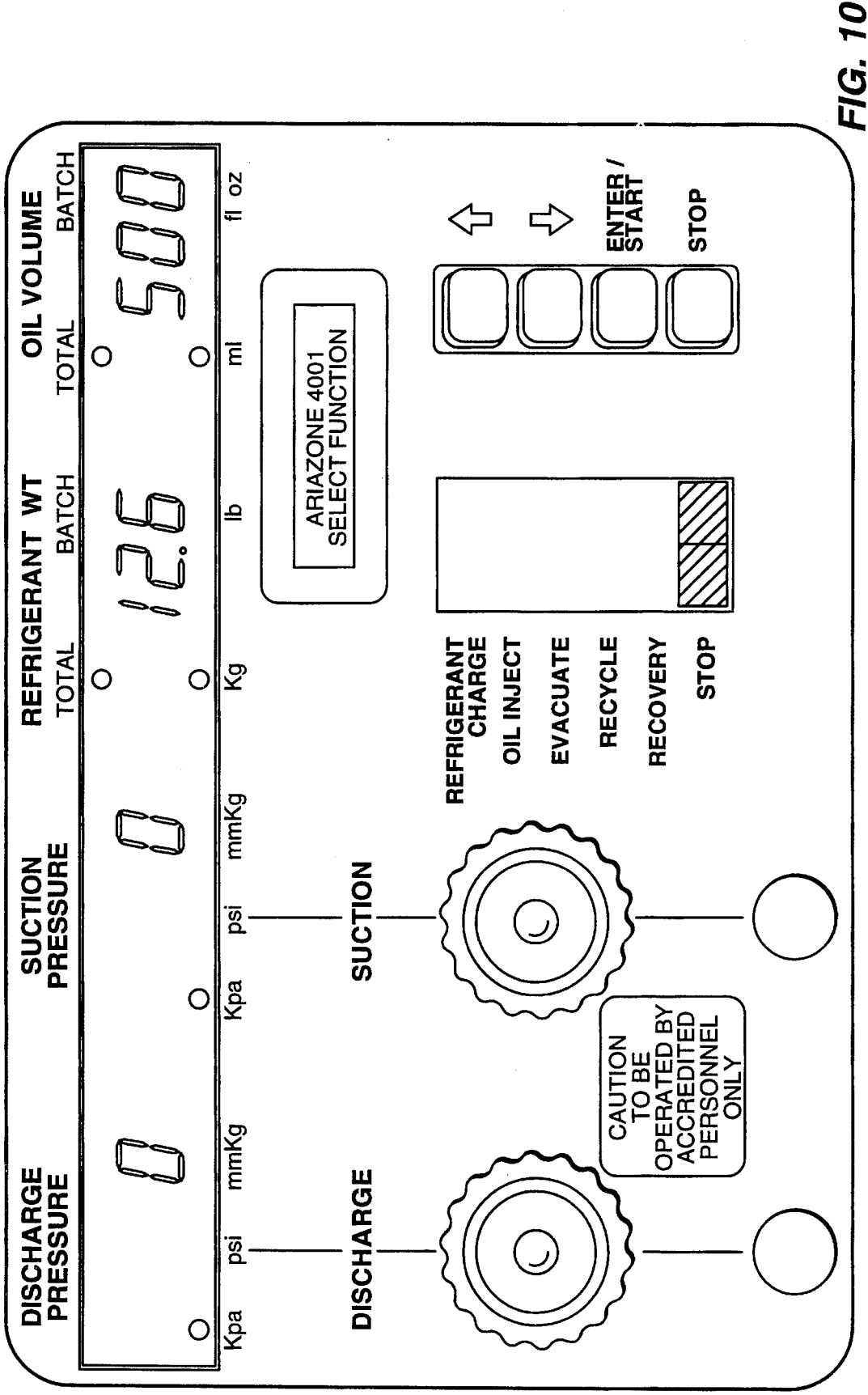

FIG. 10 is a representation of a control panel.

INTEGER LIST

1. Compound gauge
2. Pressure gauge
3. Vapour line solenoid
4. Liquid line solenoid
5. Manifold solenoid
6. Charge solenoid
7. Recovery solenoid
8. Primary filter—oil separator
9. Pressure in system sensor
10. Function manifold
11. Recovery complete sensor
12. Recovery compressor
13. Evacuation pump
14. Oil return
15. Moisture indicator
16. Transformer
17. Main filter
18. Capillary tube
19. Check valve
20. High pressure sensor
21. Vapour line quick coupling
22. Liquid Line quick coupling
23. Cylinder valve—liquid
24. Cylinder valve—vapour
25. Condenser (heat exchanger)
26. 25 kg Cylinder
27. Platform
28. Load cell
29. Change over valve
30. Liquid pump
31. 240 V Electric motor
32. Microprocessor
33. Bulk head fitting
34. Recovery sensor check valve
35. Gauge manifold 36. Filter recovery port
37. Valve
38. Valve
39. Connector
40. Connector
41. Connector
42. Line
43. Line
44. Line
45. Line
46. Line
47. Solenoid valve
48. Line
61. Frame
62. Wheels
63. Fan
64. Sub-frame
66. Control panel
67. Platform
68. Liquid line
69. Vapour line
71. Line
72. Line
73. Line
74. Line
76. Line
C1. Condenser
F1. Primary filter oil separator
F2. Main filter
HV1. Hand valve—suction
HV2. Hand valve—discharge
HV3. Hand valve—air bleed
HV4. Hand valve—self recovery
M1. Evacuation pump
M2. Liquid pump
M3. Recovery pump
M4. Cooling fan
NRV1. Non return valve—discharge
NRV2. Non return valve—vapour
NRV3. Non return valve—oil charge
OR 1. Oil reservoir—a column, higher than wide
P1. Service port—suction
P2. Service port—discharge
P3. Port—cylinder, vapour side
P4. Port—cylinder, liquid side
P5. Port—atmosphere
PT1. Pressure transducer—suction
PT2. Pressure transducer—discharge
PT3. Pressure transducer—system
PT4. Pressure transducer—oil volume
SG1. Sight glass
SV1. Solenoid valve—liquid
SV2. Solenoid valve—vapour
SV3. Solenoid valve—oil inject
SV4. Solenoid valve—evacuate
SV5. Solenoid valve—recover
SV6. Solenoid valve—refrigerant charge

DETAILED DESCRIPTION WITH RESPECT TO THE DRAWINGS

Figure 1:
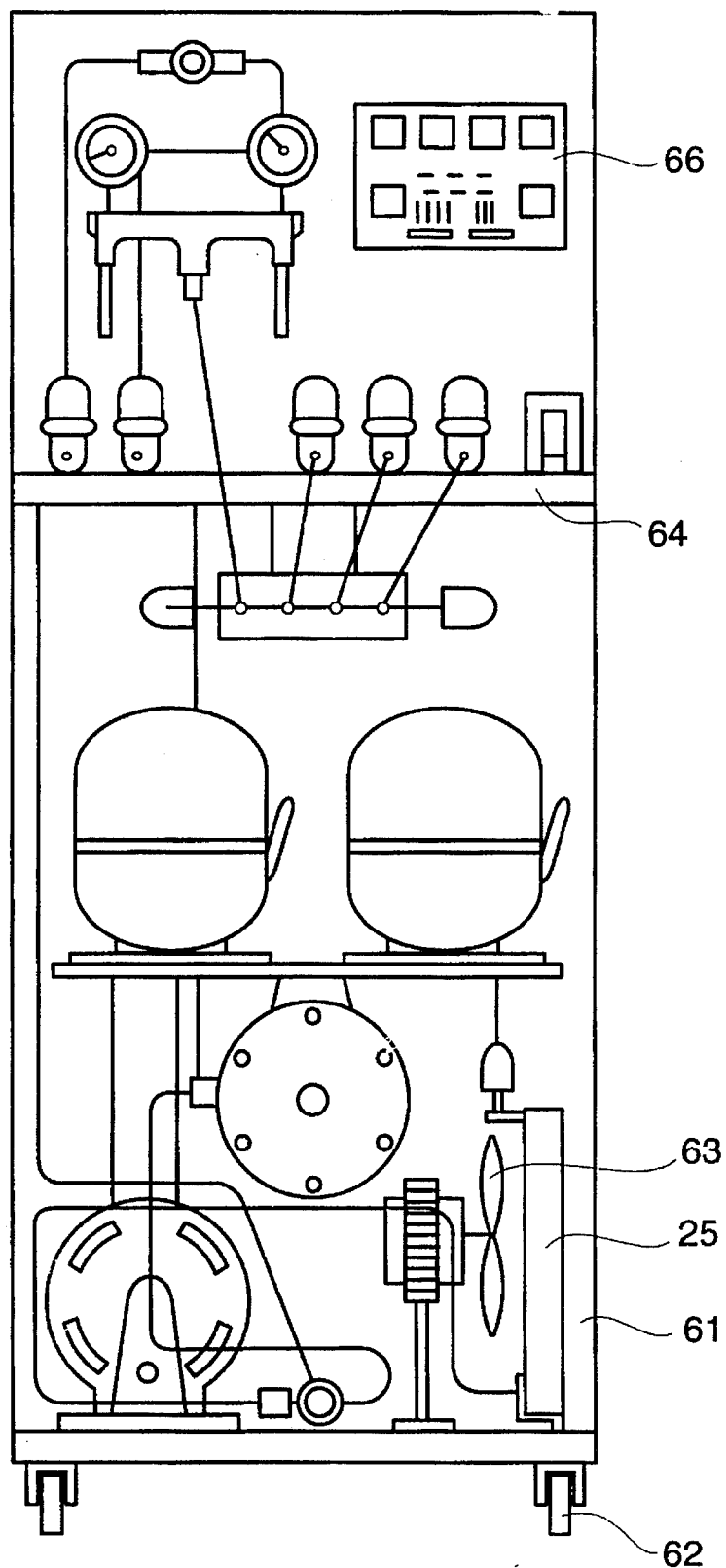
FIG. 1 is a schematic drawing of a first processor.
Figure 2:
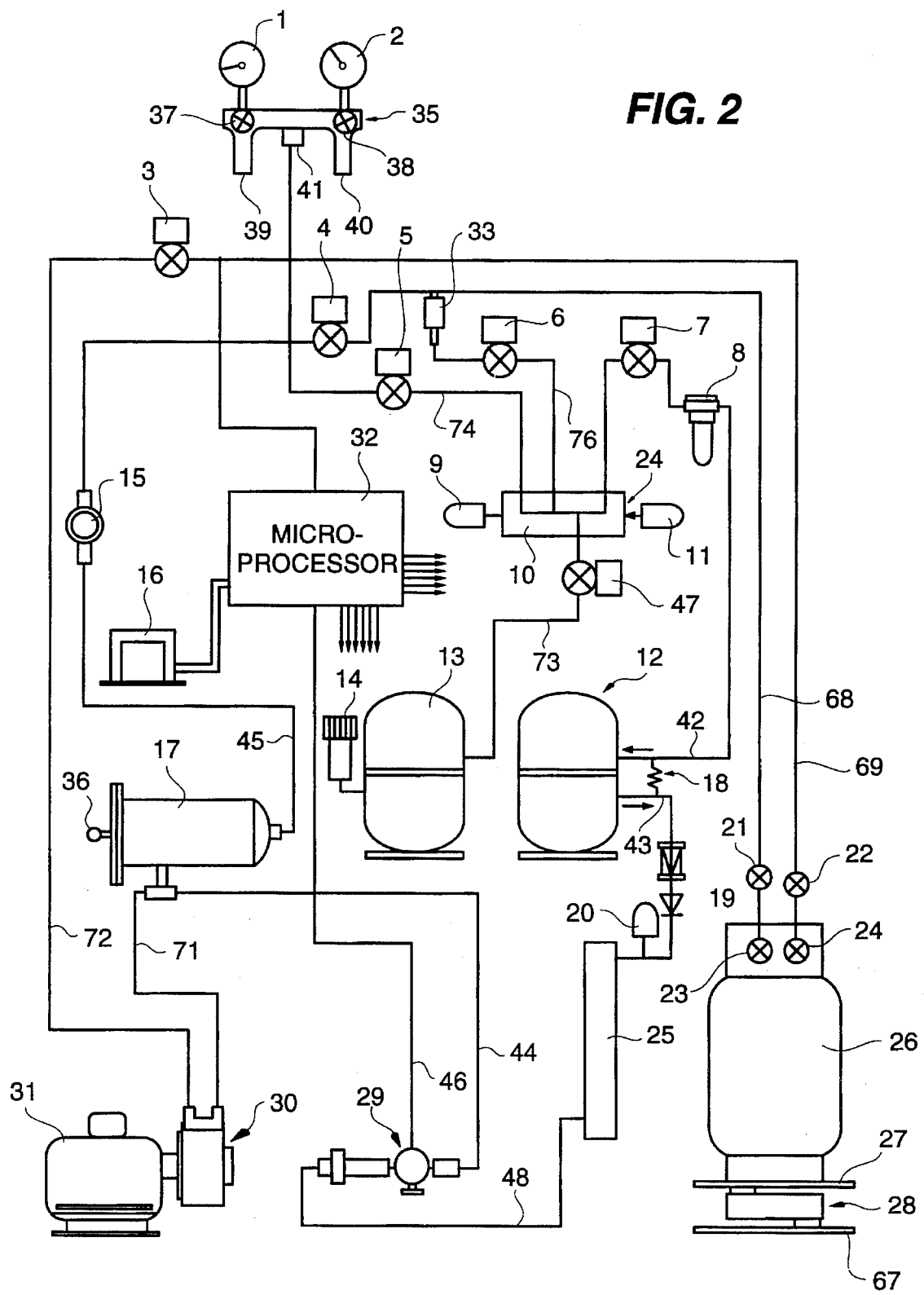
FIG. 2 is an expanded schematic drawing of the first processor.

The gas processor shown in FIGS. 1 and 2 comprises a frame 61 and a sub-frame 64 for carrying the components.

The frame 61 has wheels 62.

A manifold 35 is provided with valves 37 and 38 and has a connector 39 for connection to the suction side of an automotive air conditioning system and a connector 40 for connection to the discharge side of the air conditioning system.

Gauges 1 and 2 are mounted to the manifold. Gauge 1 will show the suction pressure of the air conditioning system. Gauge 2 will show the discharge pressure of the air conditioning system. Pressure shown will be dependant on ambient temperature, at 25° C. one would expect a reading of about 15–25 psig on the suction side and 150–200 psig on the discharge side if the air conditioning system is in good order and functioning correctly.

Mounted to the rear of the gas processor (not shown in FIG. 1) is a platform 67 on which there is located a load cell 28, another platform 27 on which is located a 25 kg cylinder 26 of refrigerant gas. The load cell 28 constantly monitors the weight of the cylinder 26 and provides information to the microprocessor 32.

The cylinder 26 has valves 23 and 24 which are respectively connected to the liquid in the cylinder 26 and to the vapour in the cylinder 26.

A liquid line 68 is provided and a vapour line 69 is provided. Quick connect couplings 21 and 22 are provided for the lines 68 and 69 to enable those lines to be closed at such time as it is desired to change the cylinder 26.

Line 68 passes via solenoid valve 4, a moisture indicator 15, line 45 to a main filter 17, the filter is provided with a filter recovery port 36.

The filter is in turn connected via line 71 to a liquid pump 30 which is drivable by an electric motor 31.

The pump 30 is connected via line 72 to solenoid valve 3 which is connected to line 69.

Line 69 is also connected via line 46 to a change over valve 29 which is connected via line 44 to the filter 17 and via line 48 to a condenser 25.

A line 43 leads from the condenser 25 to the outlet of a recovery compressor 12. In the line 43 is a high pressure sensor 20 and a check valve 19.

The inlet to the recovery compressor 12 is connected via a line 42 to a primary filter—oil separator 8, thence via a recovery solenoid 7 to a manifold 10.

The manifold 10 has a pressure sensor 9.

A capillary tube 18 extends between the lines 42 and 43.

Connected to the manifold 10 is a pressure sensor 9, a recovery complete sensor 11 and a recovery sensor check valve 34.

A line 73 leads via a solenoid valve 47 to an evacuation pump 13 fitted with an oil return 14.

The manifold 10 is also connected via a line 74 to a solenoid valve 5 to a connector 41 on the manifold 35.

The manifold 10 is also connected via line 76, solenoid valve 6, bulk head fitting 33 to line 68.

A fan 63 is provided for cooling the condenser 25.

A microprocessor 32 and transformer 16 is provided.

There is a display and control panel 66.

The manner in which the above described gas processor can be used will now be described.

To recover refrigerant gas from the air conditioning system a button on the control panel 66 is pressed to commence the recovery cycle.

Gas will pass via one or both of connectors 39 and 40 to connector 41. Solenoid valves 5 and 7 are opened by the microprocessor 32 and gas passes via valve 5 to manifold 10 then via solenoid 7, through primary filter—oil separator 8, via line 42 to the inlet of compressor 12.

From the compressor 12, which is actuated, gas passes via line 43 through check valve 19 to condenser 25 where the gas is cooled.

Refrigerant from the condenser 25 goes via change over valve 29, line 44 to main filter 17 and, after filtration, the refrigerant passes through moisture indicator 15, through solenoid 4, to cylinder 26 via coupling 21 and valve 23.

The load cell 28 constantly monitors the weight of the cylinder 26 and a shut down will be done by the microprocessor if the cylinder 26 becomes more than 80% full.

In recovery, the recovery will pause for 2½ minutes or some other time when pressure in the system has reached above 10 inches of mercury and "recovery pause" will be displayed. After the pause, recovery will restart until system pressure is about 20 inches of mercury.

The display and control panel 66 will then show "Recovery Complete Select Function". The panel 66 can also display the amount of gas in the cylinder.

To recycle refrigerant, a button on the control panel is pressed and the microprocessor 32 opens several of the solenoid valves.

Refrigerant is withdrawn from cylinder 26 via valve 24 through solenoid valve 3 to the liquid pump 30 which is operated and which pumps liquid through main filter 17, through line 45, through solenoid 4 to valve 23 on cylinder 26.

Such recycling will clean the refrigerant.

Such recycling can proceed for an indefinite period until it is manually stopped or can proceed for a set period of time.

The microprocessor 32 is such as not to proceed with recycling if there is less than 2 Kg of refrigerant in the cylinder. This is done to ensure that the pump 30 does not cavitate.

To evacuate the air conditioning system a button on the control and display panel 66 is pushed and the microprocessor 32 opens certain solenoid valves.

Such air as there is in the air conditioning system passes via connectors 39 and 40, connector 41, solenoid 5, manifold 10 to the vacuum pump 13 and exhausts via oil separator 14.

The microprocessor will sense if there is refrigerant pressure in the air conditioning system and will not operate in evacuation mode if there is pressure in the system.

Evacuation can proceed for a definite or indefinite time or until a particular level of vacuum has been reached.

To charge the air conditioning system with refrigerant a button on the control and display panel will be pressed and the display will display an amount to be charged. If that amount is satisfactory, another button is pressed. If the amount is unsatisfactory a different amount can be keyed in and thereafter charging can commence.

In charging the microprocessor opens various solenoid valves and refrigerant passes via valve 23, solenoid valve 6, manifold 10, solenoid valve 5, line 41, manifold 32 to the air conditioning system.

The microprocessor 32 monitors the weight of the cylinder 26 via the load cell 28 and when the correct charge amount has been delivered it closes various of the solenoid valves and displays charge complete on the display and control panel 66.

The microprocessor counts the time that the gas processor is in recover or recycle mode and after 200 hours of such use it indicates that service is required.

Servicing will, at least, involve changing filter 17 but before the gas processor can be serviced there will be a need to recover refrigerant in the gas processor. The ability to self recover refrigerant is a feature of the gas processor as described above.

In self recovery connector 39 is connected to filter recovery port 36, charge over valve 29 is manually turned to connect lines 46 and 48.

A code is then entered into the microprocessor 32 via the control and display panel 66 and self recovery commences.

In self recovery refrigerant passes from filter 17, through port 36, connector 39, connector 41, solenoid valve 5, manifold 10, solenoid valve 7, separator 8, compressor 12, valve 19, condenser 25, valve 29, line 46 to line 69 and then to cylinder 26.

The recovery complete sensor 11 will sense when pressure drops to about 10–15 inches of mercury and thereafter the microprocessor 32 will cause self recovery to stop.

The above described microprocessor has various safety features including that it will turn off when cylinder 26 is full or when there is over-pressure at sensors 9 or 20.

The self recovery is also a useful safety feature.

Further, if there is less refrigerant in the cylinder 26 than a desired amount of charge then the panel 66 will display a message to the effect not enough gas, replace cylinder or stop.

The microprocessor can also, via the cell 28 and the panel 66, set the tare weight of the cylinder 26 and in a span calibration, a check that display is correct, a known weight is added.

The recovery pause is a useful feature in that some refrigerant in liquid form may be present and the pause allows the liquid refrigerant to boil so that it can be recovered.

Modifications can be made to the above.

Amongst those modifications are that the gauges 1 and 2 may be replaced by pressure transducers and a digital display.

There may be a gauging of the temperature and pressure of the cylinder 26 to detect if air has got into the cylinder 26 and the need to bleed off air can be displayed.

Temperature of air coming out of the system may be measured and can cause cycling as desired.

If desired, the gas processor can be set to automatically recover, then recycle and then recharge.

Remote control means may be provided.

Figure 3:
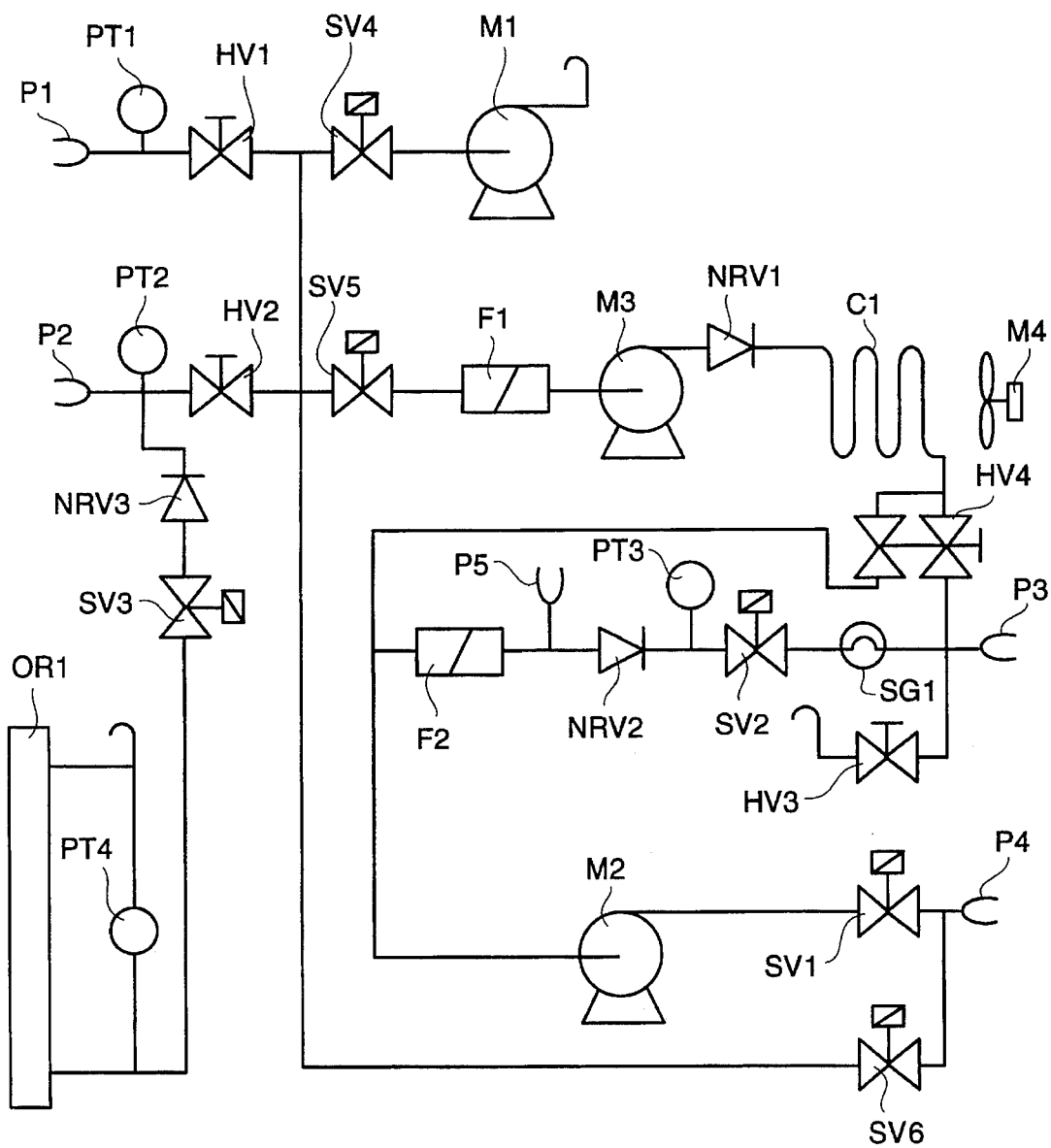
FIG. 3 is a schematic drawing of a second processor.

Reference is now made to FIG. 3 which shows the second processor.

In FIG. 3, certain devices such as a cylinder, a load cell for taking the weight of the cylinder and a microprocessor are not shown but are to be understood as being present.

The "PT" transducers sense pressure but also compensate for.

The evacuation pump M1, the valve HV3 and the pressure transducer PT4 are all connected to atmosphere.

1. The following describes the function and logical operation of the refrigerant processing system shown in FIG. 3 and the Flow diagrams FIGS. 4–9.

Functions of Microprocessor

2. The system of FIG. 3 contains a microprocessor to control all of the primary functions within the machine. The microprocessor receives inputs from the following devices:

a. Load Cell. This device is situated under the refrigerant storage cylinder and is used to detect the weight of the refrigerant contained within this cylinder. This weight information is used for control and display purposes.

b. Refrigerant Pressure/Temperature Sensors. Three integrated pressure and temperature sensors transduce the pressure and temperature of the system points into electrical signals. These devices are situated to detect the pressure and temperature of the suction service port, the discharge service port and the internal system. The resultant information is used for control and display purposes.

c. Oil Volume Pressure Transducer. A pressure transducer is situated to detect the pressure at the base and the top of the oil storage vessel which is desirably a column of height greater than width. The resultant pressure is used to determine the quantity of oil in the vessel. This information is used for the display of remaining oil and for the Oil Injection function.

d. User Key Pad Four keys consisting of 'Up', 'Down', 'Enter/Start', and 'Stop' are used to control the mode of the machine and provide data entry.

e. Remote Control Sensor. An infra red detector is used to detect transmissions from an infra red remote control handpiece. The remote control contains four keys which mimic the user key pad.

3. The microprocessor has control over the following devices:

a. Liquid Crystal Display (LCD) Module. An LCD display provides up to 2 lines of 16 alpha-numeric characters. This information is used to provide the user with the machines status and mode of operation.

b. Display Status Annunciators. A group of Light Emitting Diode (LED) indicator blocks are located beside a legend of operating modes. These indicators are used to inform the user of the mode of operation of the machine. These indicators are intended to be viewed from several meters.

c. LED Numerical Display Units. Four groups of LED numerical displays are used to inform the user of Suction and Discharge pressures, Oil Volume and Refrigerant Weight. During the Oil Inject operation the display changes mode to indicate the batched quantity of oil rather than the total quantity of oil. Similarly, during Refrigerant Charge operations the Refrigerant Weight display indicates the weight of refrigerant batched, rather than the total remaining refrigerant.

d. Numerical Display Annunciators. Each of the Numerical Displays are provided with status annunciators. These indicate the units of display, namely Kpa, psi or in Hg for the pressure displays, Kg or lb for the refrigerant weight displays and ml or fl-oz for the oil quantity display. In addition the Refrigerant Weight and Oil Volume displays have "Batch" or "Total" annunciators to indicate the mode of the displays during Refrigerant Charge or Oil Inject operations respectively.

e. Sonalert. A sonalert or audible indicator is used to alert the user of warning conditions and provide key pressed feedback.

f. Solenoids. The microprocessor controls the status of the Liquid, Vapour, Oil Charge, Evacuate, Recover and Refrigerant Charge solenoids.

g. Electric Motors. The microprocessor controls the state of the electric motors used to drive the Evacuation Pump, Recycle Pump, Recovery Pump and the Condenser Fan.

Description of Operating Modes

4. The Ariazone has several primary modes related to maintenance of refrigeration systems. In addition the unit has secondary modes related to the setup or maintenance of the machine. Finally the unit performs several activities regardless of the mode of the machine. These functions are termed "Background Tasks". The following paragraphs describe these modes and activities.

Background Tasks

5. The microprocessor perform several tasks continuously. The tasks are described as follows:

a. Keyboard Scan. The keyboard is scanned and converted into individual key presses. The status of the keyboard is available to the primary mode functions.

b. Remote Control Scan. The remote control sensor is scanned to determine if any keys on the remote control have been pressed.

c. Sensor Scan. All of the sensor output are scanned and converted to digital representations of their inputs.

d. Sensor Computation. The raw digital values from the sensor scan are converted into meaningful values. These calculations use constants stored in the microprocessors memory during the Calibration mode.

e. Display Update. The numerical displays are updated with pressure, oil volume and refrigerant weight information calculated during the sensor computations. The actual value displayed is dependant on the units selected during setup, ie weight in kg or lb.

f. Timer Update. Various timers used in the primary modes are updated. In addition a timer to determine the remaining life of the primary filter is updated.

g. Mode Annunciator Update. The mode annunciators are updated according to the primary mode selected. In addition the annunciators may be selected to flash in a variety of manners if required.

Stop Mode

6. The mode of operation may be selected from the keyboard or the remote control. The preselected mode of the machine in will be indicated by the LCD display and LED mode annunciators. When the mode selected is satisfactory the user is to press another button on the keyboard or the remote control. The desired mode will then commence.

7. Whilst the unit remains in the Stop mode, no motors or solenoids are operated, however all of the numeric displays will operate.

Recovery Mode

8. The purpose of the Recovery mode is to recover refrigerant from a refrigeration system, filter and condense the recovered refrigerant, and store the liquid refrigerant in the storage cylinder.

9. To initiate the Recovery mode a button on the keyboard or remote control is pressed. The LCD display will indicate that the recovery mode is running, whilst the mode annunciators will have a distinctive appearance. The cooling fan and the recovery pump will operate, and several solenoids will open. This will cause refrigerant to be drawn from the external refrigeration system into the storage cylinder via the service hoses, recovery solenoid, primary filter/oil separator, recovery pump, condenser, self recovery valve, main filter, recovery check valve, vapour solenoid, moisture indicator, and vapour hose.

10. In normal operation the above condition will be maintained until a vacuum of −50 Kpa (15 in Hg) is reached at either the discharge or suction ports, as sensed by the discharge and suction pressure sensors. The microprocessor will cause an audible warning, and the machine will enter the recovery paused mode. In this mode the machine will shut off the pump and pause for 150 sec. During this pause the "Recover" mode annunciator will be illuminated constantly and the LCD display will indicate the remaining pause time, for example: "RECOVERY PAUSED TIME 2:29 min"

11. If at the end of this period a pressure of less than −20 Kpa has been maintained at either the discharge or the suction ports, as sensed by the pressure sensors, the machine will stop, the mode annunciator LED will have a distinctive appearance, and the LCD display will indicate the following message: "RECOVER COMPLETE—PRESS STOP". The unit will return to the Stop mode a button on the keyboard or the remote control is pressed.

12. If the pressure as sensed by either the suction or discharge pressure transducers was greater than −20 KPa the machine will enter the "Recover—Rerunning" mode. In this mode the recovery pump will operate for 2 minutes. During this time the Recovery mode annunciators will flash and the LCD display will convey the message "RECOVERY MODE RE-RUNNING".

13. Once the two minute interval has elapsed and a pressure of less than −50 KPa has been sensed at either the suction or pressure sensors, the LCD will display the "Recover Complete" message and wait for the user to press a particular button on the remote control or the keyboard.

Conditions that will Halt the Recovery Mode

14. The above sequence assumes that neither the stop button was pressed, or no other undesirable condition occurred. The following conditions will cause the machine to halt the recovery mode:
   a. Cylinder Full. If the weight of the refrigerant in the cylinder exceeds 20 Kg as sensed by the load cell, the cylinder is near full and cannot accept more refrigerant.
   b. High Pressure. If the pressure sensed by the system pressure transducer exceeds 1700 Kpa (180 psi) the machine will stop to protect its pump.

In either circumstance, the microprocessor will cause warnings to occur audibly, and to appear on the LCD and mode annunciator displays. These warnings will continue until a particular button is pressed on the remote control or the keyboard.

Recycle Mode

15. Once the recycle mode has been initiated the mode annunciator and LCD display will indicate the operation of this mode. After four seconds the LCD will prompt the user to enter the desired Recycle time. The recycle time can be set from 5–60 minutes using keys on the keyboard. During this operation the LCD display will have an appearance similar to "SET RECYCLE TIME >15 MIN<"

16. Once the desired recycle time appears on the display, the user is to press another button on the keyboard. The recycle pump and condenser fan will now run, the "Recycle" annunciator segments will flash alternately, and the LCD display will indicate the run time in minutes, for example "RECYCLE RUNNING TIME 14:59 MIN".

In addition several solenoids will open and cause refrigerant to be circulated from the storage cylinder via the liquid solenoid, liquid pump, main filter, vapour solenoid, air bleed manifold, and moisture indicator.

17. Once the preset time has elapsed, the pump and fan will stop, the "Recycle" segments will illuminate steadily, and the display will convey the message "RECYCLE PAUSE CHECKING PURITY". After 2.5 minutes, the machine will produce an audible warning and indicate a measure of the purity of the refrigerant.

18. Since refrigerant has been circulating past the system pressure and temperature sensor, the sensed pressure and temperature will obey physical gas laws if the refrigerant is pure. If for a given temperature the sensed pressure is incorrect, the refrigerant is deemed impure. Accordingly the microprocessor calculates a measure of refrigerant purity based on preprogrammed gas law tables.

19. If the refrigerant is determined to be pure the LCD display will convey a message similar to the following: "R134 PURITY: 98% REFRIGERANT PURE". The machine waits for the user to press a particular button on the machine or the remote control. This will return the machine to the Stop mode.

Refrigerant Contains Impurities

20. If the refrigerant is determined to be excessively impure, it is probable that non-condensable gases (such as air) exist in the cylinder. This is indicated by a purity reading of less than 90%. An example of this is as follows: "R134 PURITY: 74% BLEED REQUIRED". This warning is intended to instruct the user to open the air bleed hand valve to allow any impurities (usually residing in the top of the cylinder) to escape. The machine waits for the user to press a particular key on the machine or the remote control. This will return the machine to the Stop mode.

Conditions that will Halt the Recycle Mode

21. The above sequence assumes that neither the stop button was pressed, or that no other undesirable condition occurred. The following conditions will cause the machine to halt the recycle mode:
   a. Refrigerant Cylinder Near Empty. To prevent the recycle pump from scavenging from an empty cylinder, the machine ceases recycling if the weight of the refrigerant in the cylinder becomes less than 2 Kg as detected by a load cell.
   b. High Pressure. If the internal pressure exceeds 1700 Kpa as detected by the system pressure sensor the machine will stop.

In either circumstance, the microprocessor will cause warnings to occur audibly, and to appear on the LCD and mode annunciator displays. These warnings will continue until a particular button is pressed on the remote control or the keyboard.

Evacuate Mode

22. The purpose of the Evacuate mode is to evacuate the contents of an external refrigeration system to the atmosphere.

23. To initiate the Evacuate mode, the user is to press the "Up" key three times followed by Enter on either the console or the remote control. The Evacuate mode annunciators will now flash, and the LCD display will display the elapsed run time in the following manner: "EVACUATE MODE TIME: 1:12 Hrs". The Vacuum pump will then operate and solenoids will open, causing any vapours present at either the discharge or suction ports to be exhausted to the atmosphere via the evacuation solenoid and vacuum pump.

24. The machine is returned to the Stop mode when a particular key of the keyboard or remote control is pressed.

Condition that will Prevent the Evacuate Mode from Commencing—"Pressure in System"

25. The only condition that will prevent the execution of the Evacuate Mode is the existence of pressures of greater than 20 Kpa as detected by the Discharge or Suction pressure sensors. This condition will cause the following indication on the LCD display: "PRESSURE IN SYS, RECOVER GAS." Under this circumstance, the microprocessor will cause warnings to occur audibly, and appear on the LCD and mode annunciator displays. These warnings will continue until a particular button is pressed on the remote control or the keyboard.

Oil Inject Mode

26. The purpose of the Oil Inject Mode is to batch a user defined quantity of refrigerant oil from the storage cylinder into the refrigeration system.
27. To initiate the Oil Inject mode, buttons on the keyboard are pressed. On commencement of this mode the mode annunciators and LCD display will indicate the Oil Inject Mode.
28. This message will be maintained for six seconds, followed by a message prompting the user to update the desired oil inject quantity. LCD will have an appearance similar to the following: "SELECT OIL VOL: >24 ml<"
29. The user is now to manipulate the keyboard until the desired oil volume is indicated on the LCD display. The maximum oil quantity available to the user is determined by the actual oil quantity available in the storage vessel, as measured by the oil volume pressure sensor.
30. Once the user has set the desired oil injection quantity, the machine waits for a button on the keyboard to be pressed. The LCD display, the mode annunciators and the numeric display annunciators will indicate that Oil Injection is paused to occur. The numeric Oil Volume Display will indicate the volume of oil batched, at this point 0. The LCD display will indicate a message similar to the following: "OIL VOL=24 ml INJ PAUSED,CONT?". If the user presses a particular button on the keyboard or the remote control the machine will abort the Oil Inject mode, while if the user presses another button, the machine will cause the internal solenoids to open, and oil will flow from the oil reservoir into the refrigeration system via the oil injection solenoid, check valve, manifold adaptor, and hand manifold.
31. While oil is being injected into the refrigeration system, the LCD display will indicate the desired oil injection quantity, for example: "OIL VOL=24 ml CHARGING". At any point in time, the user may pause the oil injection by pressing a particular key on the keyboard or the remote control, resumed by pressing the sam key, or aborted by pressing another key on the keyboard or remote control.
32. Once the preset oil quantity, as sensed by the oil volume pressure sensor, has flowed into the system, the microprocessor will indicate the completion of this mode by a unique illumination of the mode annunciators, a message on the LCD display and an audible warning.

Conditions that will Prevent Oil Injection

33. The machine will not enter the Oil Injection mode if either of the following conditions exist:
   a. Insufficient Vacuum. If a pressure less than −50 Kpa is sensed by the discharge pressure sensor, the refrigeration system will not have the ability to draw oil into its system. The machine prevents an attempt to inject oil under these circumstances.
   b. Insufficient Oil. If less than 5 ml of oil is sensed by the oil volume pressure sensor, the machine will not allow oil injection to occur.

In either circumstance, the microprocessor will cause warnings to occur audibly, and to appear on the LCD and mode annunciator displays. These warnings will continue until a particular button is pressed on the remote control or the keyboard.

Refrigerant Charge Mode

34. The purpose of the Refrigerant Charge Mode is to batch a user defined weight of refrigerant into the refrigeration system.
35. To initiate the Refrigerant Charge mode the user is to press keys on the keyboard. The mode annunciator and LCD display will convey the mode of the machine.
36. This message will be maintained for six seconds, followed by a message prompting the user to update the desired refrigerant charge quantity. The LCD will have an appearance similar to the following: "UPDATE CHARGE Wt >10.1 Kg<".
37. The user is now to manipulate the buttons on the keyboard until the desired refrigerant charge weight is indicated on the LCD display. The maximum refrigerant weight that can be set at this point is determined by the actual refrigerant weight available in the cylinder as sensed by the load cell.
38. Once the desired refrigerant charge weight has been set, the user is to press a particular key on the machine or remote control. The mode annunciators will indicate that the machine is paused whilst the LCD display will inform the user that the charging process is paused to occur. In addition the numerical Oil Volume display will indicate "0" to inform the user that no refrigerant has been passed into the refrigeration system.
39. If the user presses a particular key on the keyboard or remote control, the Refrigerant Charge mode will be aborted, while if another key is pressed on the keyboard or the remote control internal solenoids will open, and refrigerant will flow from the refrigerant storage cylinder into the refrigeration system, via the air bleed manifold, charge solenoid, and hand manifold.
40. While refrigerant is being batched into the refrigeration system, the "Refrigerant Charge" mode annunciators will flash distinctively, while the "Refrigerant Wt" display will indicate the weight of refrigerant actually batched into the refrigeration system, as sensed by the load cell. In addition the LCD display will indicate the desired refrigerant charge weight, for example: "CHG WT=10.1 Kg CHARGING". The refrigerant charge process may be paused by pressing a key on the keyboard or remote control, aborted by pressing another key on the keyboard or remote control, or restarted by pressing the original key on the keyboard or remote control.
41. Once the preset refrigerant weight has flowed into the refrigeration system, the mode annunciators, audible warning and LCD display will indicate that the refrigerant charge process has been completed. These indications will be maintained until the user presses a key on the keyboard or remote control, and then the machine will be returned to the Stop mode.

Condition that will Prevent Refrigerant Charging—Insufficient Refrigerant

42. If there is less than 50 g of refrigerant remaining in the cylinder, as sensed by the load cell, the user will receive a warning message when a Refrigerant Charge operation is attempted. This warning will occur audibly, by a message on the LCD display and by the appearance of the mode annunciator panel. These indications will be maintained until the user presses a key on the keyboard or remote control, and then the machine will be returned to the Stop mode.

Secondary Modes

43. The machine has four secondary modes related to the setup or maintenance of the machine. These modes are initiated by holding particular keys on the keyboard whilst power is applied to the machine. These modes are accessed in this manner to prevent their accidental execution during normal operation. These modes are described in the following paragraphs:

Calibration Mode

44. A calibration mode allows the manufacturer of the machine to adjust internal coefficients to compensate for manufacturing tolerances in the load cell, pressure and temperature sensors. In addition the type of refrigerant being either R12 or R134A may be selected.

45. In operation the manufacturer may select the particular coefficient to be adjusted, while the LCD display informs the user of the results of that adjustment. For example, during an adjustment of the resistance detection circuit the LCD display may have an appearance similar to the following: "1 T1_SPAN 1000 R1=2001.3 Ohms". This informs the manufacturer of the number and name of the coefficient to be altered (1 T1_SPAN), the actual value of the coefficient (1000) and the computed result affected by changes to this coefficient (2001.3 Ohms).

Relay and Solenoid Test Mode

46. A Relay and Solenoid Test mode is used allow the manufacturer to confirm the correct operation of the solenoids and electric motors (which are controlled by the microprocessor). The manufacture manipulates the keyboard to select the operation or not of the desired motor or solenoid. The manufacturer then confirms the actual operation or not of that particular motor or solenoid.

Filter Recovery Mode

47. The microprocessor determines the actual period of operation of the filter and informs the users of the machine of this period via the LCD display. This takes place for a period of time after power has been applied to the machine, for example "REMAINING FILTER LIFE: 45 hours". Once the remaining life reaches a predetermined limit, for example 10 hours, the microprocessor will warn the operator of this fact, again via the LCD display, for example "WARNING: FILTER NEARING EXPIRY". Finally once the remaining filter life is zero, the machine will be disabled. This will accompanied by a audible warning, a massage on the LCD display and distinctive illumination of the mode annunciators.

48. Personal responsible for maintaining the machine are then required to replace components of the main filter assembly. Since the filter housing contains refrigerants in normal operation, a mode has included to allow the recovery of these refrigerants into the storage cylinder. Prior to execution of this mode the recovery valve is manually opened and a hose is connected from the main filter port to the suction port.

49. After this mode has been initiated the machine will pause until the user presses a particular key on the keyboard. Solenoids will then open, and the cooling fan and recovery pump will operate. This will cause refrigerant to flow from the main filter housing to the storage cylinder via the hand manifold, recovery solenoid, primary filter/oil separator, condenser, self recovery valve, air purge manifold and vapour hose.

50. In normal operation the above condition will be maintained until a pressure of less than −50 Kpa (15 in Hg) is reached at either the discharge or suction ports, as sensed by the discharge and suction pressure sensors. The microprocessor will cause an audible warning, and the machine will enter the recovery paused mode. In this mode the machine will shut off the pump and pause for 150 sec. During this pause the "Recover" mode annunciator will be illuminated constantly and the LCD display will indicate the remaining pause time, for example: "RECOVERY PAUSED TIME 2:29 min"

51. If at the end of this period a pressure of less than −20 Kpa has been maintained at either the discharge or the suction ports, as sensed by the pressure sensors, the machine will stop, the mode annunciator LED will have a distinctive appearance, and the LCD display will indicate the following message: "REPLACE FILTER AND POWER OFF". Power is now to be removed from the machine.

52. If the pressure as sensed by either the suction or discharge pressure transducers was greater than −20 KPa the machine will enter the "Recover-Rerunning" mode. In this mode the recovery pump will operate for 2 minutes. During this time the "Recovery" mode annunciators will flash and the LCD display will convey the message "FILTER RECOVERY RE-RUNNING". Power is now to be removed from the machine.

53. Once the two minute interval has elapsed and a pressure of less than −50 KPa has been sensed at either the suction or pressure transducers the LCD will display the "REPLACE FILTER AND POWER OFF" message.

54. Maintenance personnel are then to carry out required maintenance on the machine.

55. When power is next applied to machine the maintenance personnel will be prompted via the LCD display to indicate whether the filter was replaced or not, for example "FILTER REPLACED Enter=Y, Stop=N". Depending on the key pressed on the keyboard, the filter timer will be reset or not and the machine will be restarted.

Display Unit Setup Mode

56. In the Display Unit Setup Mode the units in which pressure, volume and weight are displayed may be preset. The user is requested via the LCD display of the desired units of display and those selections are entered by pressing particular keys on the keyboard. The selections will then be stored in the memory of the machine.

The disclosure of the Provisional Specification No. PL2458 is to be considered to be incorporated herein.

The claims and drawings form part of the disclosure of this specification.

Finally, it is to be understood that the inventive concept in any of its aspects can be incorporated in many different constructions so that the generality of the preceding description is not to be superseded by the particularity of the attached drawings. Various alterations, modifications and/or additions may be incorporated into the various constructions and arrangements of parts without departing from the spirit and ambit of the invention.

I claim:

1. A refrigerant processor for a refrigerant system comprising a controller, a container and a plurality of controllable components including:

pump means having an input and an output;

a filter coupled to said pump means;

a condenser coupled to said pump means; and a plurality of control valves connected in lines coupled to said pump means and to said condenser and filter;

said controller including control means for setting said controllable elements to operate in a number of operating modes, including a recovery mode, a recycle mode, an oil charge mode, and a refrigerant charge mode, the controllable components, when set by said control means to operate in said recovery mode, operate in a sequence involving recovery of refrigerant from the refrigeration system by passing the refrigerant through said pump means, said condenser and said filter to form a filtered liquified refrigerant, after which said filtered liquified refrigerant is fed to said container;

said controllable components, when set by said control means to operate in said recycle mode, operate in a sequence involving, withdrawing refrigerant from said container by means of said pump means, passing the withdrawn refrigerant through said filter, and returning refrigerant which has passed through said filter to said container;

said controllable components, when set by said control means to operate in said oil charge mode, operate to pass lubricating oil to the refrigeration system;

said controllable components, when set by said control means to operate in said refrigerant charge mode, operate to pass refrigerant from said container to the refrigeration system;

said processor further including:

a lubricating oil storage vessel, and pressure transducer means adapted to detect pressure in the oil storage vessel in a first region adjacent the top of said vessel and in a second region adjacent the bottom of said vessel for obtaining a pressure differential which is a measure of the amount of lubricating oil in the vessel, and, when the controller is connected to operate the controllable components in said oil charge mode, said controller (a) inhibits passing of lubricating oil to the refrigeration system if less than a first predetermined amount of oil is present in said vessel and, (b) causes oil to flow from said vessel to the refrigeration system if there is more than said first predetermined amount of oil present in said vessel, and (c) monitors said differential during such flowing until said differential indicates that a second predetermined amount of oil has passed and (d) thereafter causes cessation of flow of oil.

2. A refrigerant processor as claimed in claim 1, including means for inhibiting passing of lubricating oil to the refrigeration system if a vacuum in the refrigeration system is not less than a predetermined pressure.

3. A refrigerant processor as claimed in claim 1, wherein the controller controls the pump means and shuts off the pump means during the recovery mode to pause the recovery of refrigerant for a period of time to allow residual refrigerant in said refrigeration system to vaporize and to restart the pump thereafter to recover said residual refrigerant.

4. A refrigerant processor as claimed in claim 1, including a support for a container of refrigerant, means for detecting the amount of refrigerant in such a container located on said support and means responsive to said detecting means for inhibiting overfilling of the container.

5. A refrigerant processor as claimed in claim 3, including means for inhibiting charging of said refrigeration system if less than a predetermined amount of refrigerant is present in the container.

6. A refrigerant processor as claimed in claim 1, wherein said operating modes including a filter recovery mode and when the control means of said controller is set to operate the controllable components in the filter recovery mode, the controllable components in the filter recovery mode are set by the controller to operate to, at least in part, isolate the filter from other components of the processor and to recover refrigerant from within the filter whereby to permit access to the interior of the filter and to a filter element therein without substantial loss of refrigerant.

7. A refrigerant processor as claimed in claim 6, wherein said control means isolates the filter at least from the condenser.

8. A refrigerant processor as claimed in claim 6, wherein means are provided to inhibit filter recovery if less than a predetermined amount of refrigerant is present in the container.

9. A refrigerant processor as claimed in claim 6, including means for ceasing filter recovery when the pressure of refrigerant in the filter is less than a predetermined value.

10. A refrigerant processor as claimed in claim 6, wherein the control means controls filter recovery and pauses the recovery of refrigerant for a period of time to allow residual refrigerant to vaporize and to restart filter recovery thereafter to recover said residual refrigerant.

11. A refrigerant processor as claimed in claim 6, wherein means is provided for, after filter recovery, prompting an operator to enter information to verify that a new filter element has been located in the filter.

12. A refrigerant processor as claimed in claim 1, wherein information concerning the expected life of a filter element in the filter is stored in the controller and during such time as the filter is filtering to decrement a register representing the remaining portion of said expected life.

13. A refrigerant processor as claimed in claim 12, wherein means is provided for displaying a representation of said remaining portion of said expected life.

14. A refrigerant processor as claimed in claim 12, wherein means is provided for displaying that said expected life has been exceeded.

15. A refrigerant processor as claimed in claim 14, wherein means is provided to inhibit operation of the processor after said expected life has been exceeded.

16. A refrigerant processor as claimed in claim 6, including means for taking a measure of pressure and temperature of refrigerant within the processor, for comparing said measure with a reference and for providing an indication of the purity of the refrigerant at the end of such a filter recovery mode.

17. A refrigerant processor as claimed in claim 1, including remote control means for controlling at least some of the operations of the processor from a distance.

* * * * *